US 6,681,742 B1

(12) United States Patent
Hirayama et al.

(10) Patent No.: US 6,681,742 B1
(45) Date of Patent: Jan. 27, 2004

(54) AIR FLOW MEASURING DEVICE FORMED INTEGRALLY WITH ELECTRONICALLY CONTROLLED THROTTLE BODY

(75) Inventors: Hiroshi Hirayama, Hitachinaka (JP); Shinya Igarashi, Naka-machi (JP); Takayuji Itsuji, Hitachinaka (JP); Yasuo Makie, Mito (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/009,638

(22) PCT Filed: Jun. 15, 1999

(86) PCT No.: PCT/JP99/03179

§ 371 (c)(1),
(2), (4) Date: Dec. 14, 2001

(87) PCT Pub. No.: WO00/77376

PCT Pub. Date: Dec. 21, 2000

(51) Int. Cl.⁷ .............................. F02D 9/10; G01F 1/684
(52) U.S. Cl. ................................. 123/399; 73/118.2
(58) Field of Search .................... 123/399; 13/118.2

(56) References Cited

U.S. PATENT DOCUMENTS

| | | | | |
|---|---|---|---|---|
| 4,723,443 A | * | 2/1988 | Usui et al. ................ | 73/118.2 |
| 5,190,012 A | | 3/1993 | Takahashi .................. | 123/479 |
| RE34,403 E | * | 10/1993 | Arai et al. ................. | 73/118.2 |
| 5,325,712 A | * | 7/1994 | Tsutsui et al. ............ | 73/118.2 |
| 6,170,475 B1 | * | 1/2001 | Lewis et al. .............. | 73/118.2 |
| 6,435,023 B1 | * | 8/2002 | Kobayashi et al. ....... | 73/118.2 |

FOREIGN PATENT DOCUMENTS

| | | |
|---|---|---|
| JP | 63272933 | 11/1988 |
| JP | 1224429 | 9/1989 |
| JP | 1247723 | 10/1989 |
| JP | 1290948 | 11/1989 |
| JP | 2275041 | 11/1990 |
| JP | 4262031 | 9/1992 |
| JP | 4265448 | 9/1992 |
| JP | 4350338 | 12/1992 |
| JP | 5059994 | 3/1993 |
| JP | 5086934 | 4/1993 |
| JP | 5346336 | 12/1993 |
| JP | 6146989 | 5/1994 |
| JP | 7279724 | 10/1995 |
| JP | 8285651 | 11/1996 |
| JP | 11044265 | 2/1999 |

* cited by examiner

*Primary Examiner*—Erick Solis
(74) *Attorney, Agent, or Firm*—Crowell & Moring LLP

(57) ABSTRACT

An air flow sensor for an internal combustion engine is disclosed. An air flow rate measurement meter, a pressure gauge, electronically controlled throttle body, and the microcomputer, etc. are integrated as one body, and the correction of the air flow rate, the control, and the fault diagnosis, etc. are done in the integrated microcomputer.

The air flow sensor outputs an air flow rate signal in which the error is deleted to suppress the discharge of the harmful exhaust gas from the internal combustion engine, carries out the self-diagnosis of the breakdown of the air flow sensor or the electronically controlled throttle body to prevent the accident beforehand, and controls to obtain the best intake air amount.

38 Claims, 15 Drawing Sheets

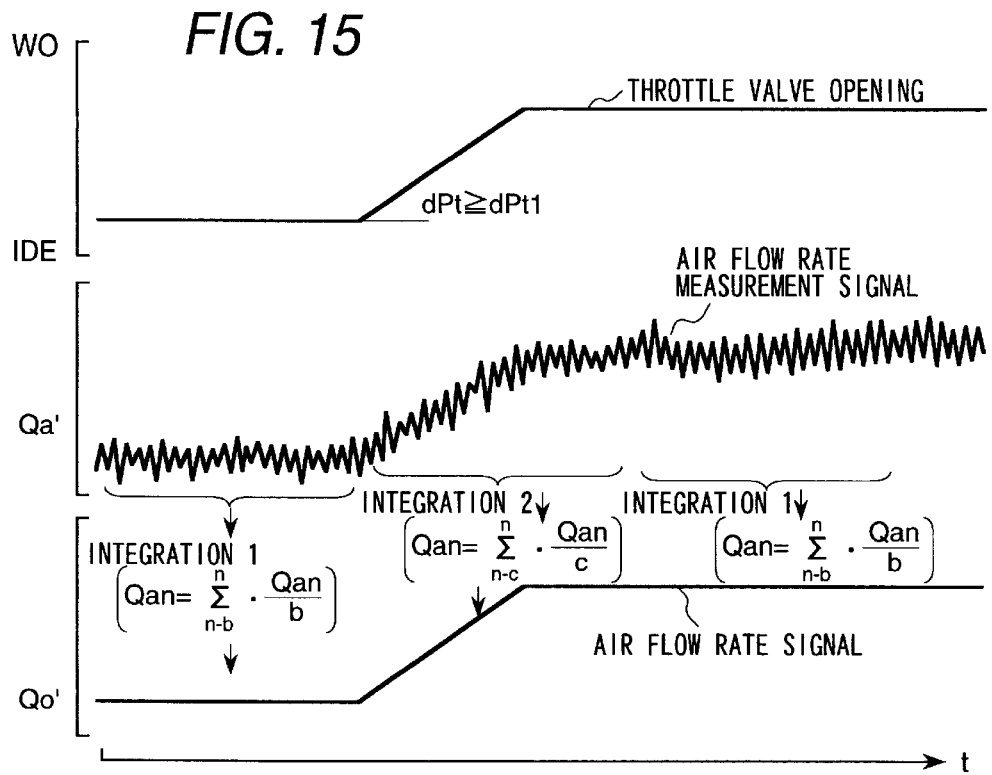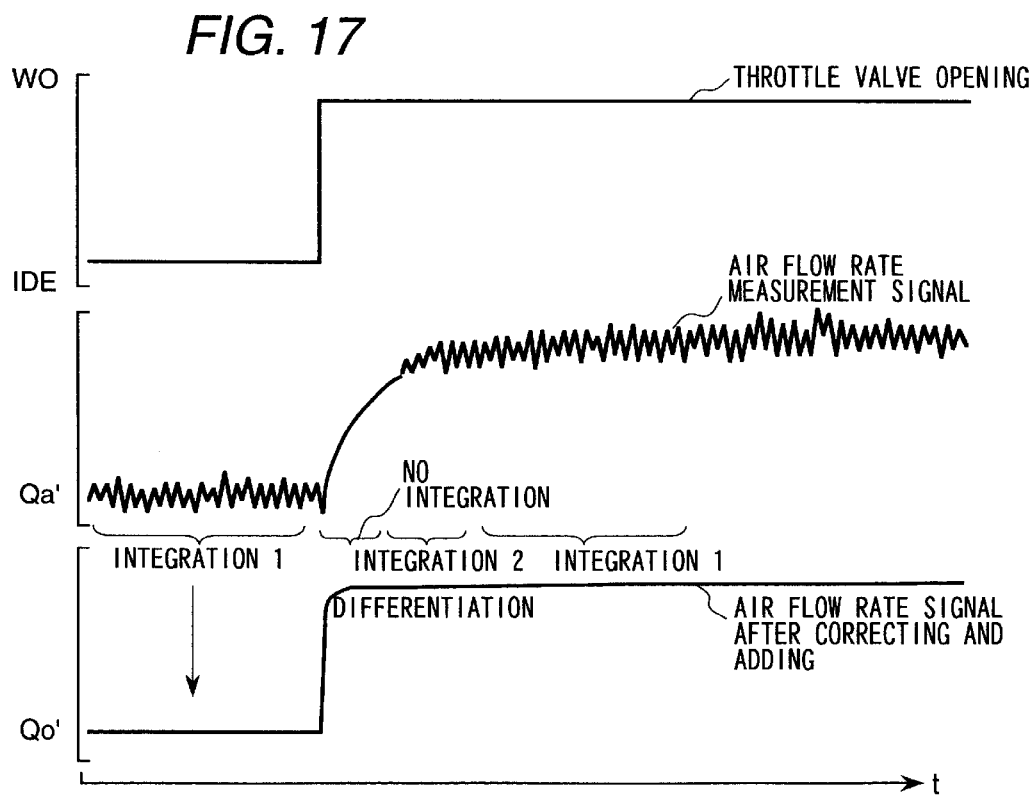

AIR FLOW MEASURING DEVICE FORMED INTEGRALLY WITH ELECTRONICALLY CONTROLLED THROTTLE BODY

TECHNICAL FIELD

The present invention relates to an air flow sensor, and particularly to an electronically controlled throttle body integrated air flow sensor which controls the amount of intake air in an internal combustion engine.

BACKGROUND ART

The prior art concerning the integration of the electronically controlled throttle body and the air flow sensor is disclosed in the Japanese Patent Application Laid-Open No. 4-350338.

Although the throttle valve opening controller of the electronically controlled throttle body and the air flow sensor are installed in the same body respectively in this prior art, they are functionally independent of each. Although a lot of errors are included in the air flow rate output signal of this air flow sensor usually, this output signal is supplied to the engine control unit as it is. Further, because the information interchange is not mutually done between the throttle valve opening information and the air flow rate signal, it is impossible to perform the self-fault diagnosis. In addition, it is not possible to perform the feedback-control of the throttle valve to become the best intake air flow, because the intake air flow signal is not input to the throttle valve controller in the conventional configuration.

In the air flow sensor, the amount of the intake air to the internal combustion engine is detected by a small detector compared with the air passage. Therefore, the error occurs in the air flow rate output signal of the air flow sensor when the turbulence or the drift or the backflow is caused even if the mass of air which flows in the air passage is the same. Because the output signal with this error is sent to the engine control unit, combustion cannot be controlled best. Therefore, the harmful exhaust gas is discharged.

A serious problem is caused due to the breakdown of the electronically controlled throttle body, so that the engine goes out of control. Therefore, the double or triple safety system and the fault diagnosis system are demanded. Further, the breakdown of the air flow sensor causes the internal combustion engine for the harmful exhaust gas to be discharged as mentioned above. In addition, it is required to control so as to obtain the best intake air flow, not to control according to the amount of the accelerator stepping, in order to suppress the discharge of such harmful exhaust gas

DISCLOSURE OF INVENTION

An object of the present invention is to provide an electronically controlled throttle body integrated air flow sensor, in which the air flow rate signal with extremely few errors is output to suppress the discharge of the harmful exhaust gas from the internal combustion engine, and the best amount of intake air is supplied to the internal combustion engine.

Another object of the present invention is to provide an electronically controlled throttle body integrated air flow sensor, in which it is possible to perform the self-diagnosis of the breakdown of the air flow sensor or the electronically controlled throttle so that the accident can be prevented beforehand.

In the device according to one aspect of the present invention, the air flow meter, the pressure gauge, the electronically controlled throttle body, and the microcomputer, etc. are integrated as one. The correction, the control, and the fault diagnosis of each measurement of the air flow rate etc. are done by the integrated microcomputer. It, therefore, becomes possible to produce the air flow sensor which can measure an accurate air flow rate at low man-hour and low-cost. The correction of the measurement to control the entire internal combustion engine or the entire car and the self-diagnosis done by the control unit so far is carried out by the air flow sensor itself. Therefore, the load of control unit is decreased. Further, wiring and a lot of power supplies become unnecessary because the information on throttle valve opening necessary for the correction can be obtained internally. Therefore, making to low-cost and the miniaturization become possible. Further, the matching man-hour can be decreased by setting the correction factor beforehand before building in the system.

BRIEF DESCRIPTION OF DRAWINGS

FIG. 15 is a timing chart which explains one embodiment of the present invention.

FIG. 17 is a timing chart which explains one embodiment of the present invention.

BEST MODES FOR IMPLEMENTING THE INVENTION

The embodiments of the present invention is explained with reference to FIG. 1 through FIG. 24.

Figure 1:
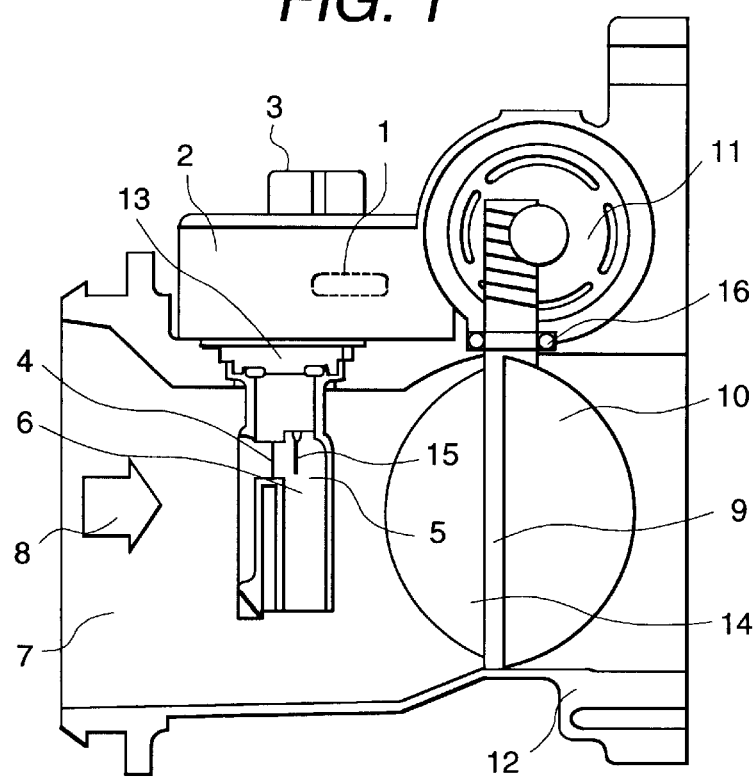
FIG. 1 is a view showing one embodiment of the present invention, and a cross-sectional view showing the configuration of the integrated air flow sensor in which the control module provided with a microcomputer is integrated with the electronically controlled throttle body.
Figure 2:
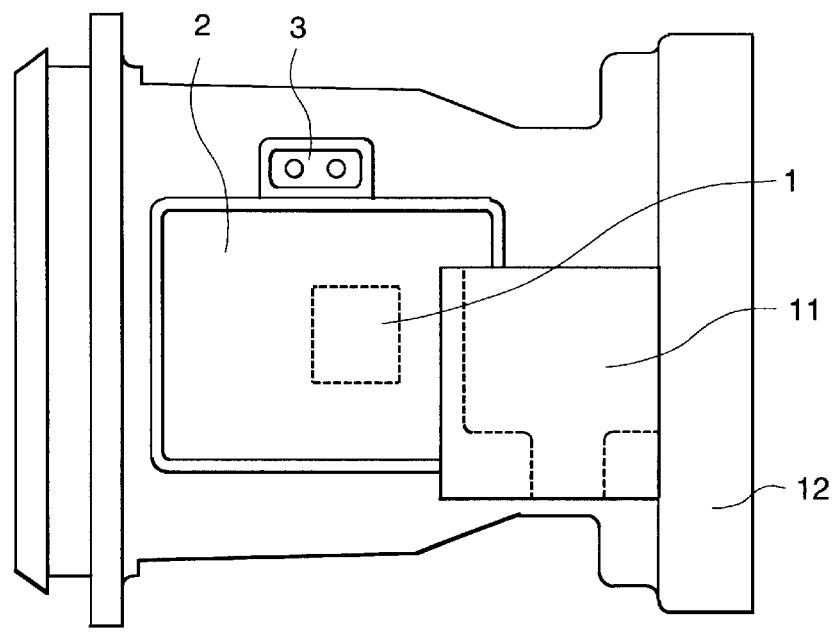
FIG. 2 is an outview in which the air flow sensor of FIG. 1 is seen from the upper part of space.

FIG. 1 is a cross section showing the configuration of one embodiment of the throttle body integrated air flow sensor according to the present invention. FIG. 2 is an outview in which the air flow sensor of FIG. 1 is seen from the upper part of space.

Electronically controlled throttle body integrated air flow sensor 12 has electronically controlled throttle body 14 which forms main air passage 7 which is a part of suction passage of the engine and to which each part is fixed, air flow sensor 13 which has thermosensitive resistor 4 which is the air flow rate detection element arranged internally in main air passage 7, electronically controlled throttle motor 11, throttle valve 10 which rotates centering on throttle shaft 9 arranged in main air passage 7, and controls the open/close of the main air passage 7, throttle valve opening sensor 16 which detects opening of throttle valve 10. In addition, control module 2 in which microcomputer 1 for correcting the air flow rate signal obtained by air flow sensor 13, and controlling throttle valve 10, etc. are built-in them.

Air flow sensor 13 provided in the upstream of throttle shaft 9 detects the air flow rate of air stream 8 in main air passage 7 of which air flow rate is controlled by throttle valve 10. Here, a heat resistance type air flow sensor is explained as an example of the air flow sensor, which has sub-air passage 6, and has heat resistor 4 and thermosensitive resistor 5 for measuring the air flow rate inside of the sub-air passage.

Heat resistor 4 and thermosensitive resistor 5 are fixed to support member 15, and connected electrically with control module 2 outside of main air passage 7. Control module 2 has an electronic circuit for controlling the heating of heat resistor 4, and microcomputer 1 which corrects the obtained air flow rate signal based on the amount of heat radiation from heat resistor 4 to air.

This microcomputer 1 not only corrects the air flow rate signal but also controls motor 11 for rotating throttle shaft 9 based on a signal from throttle valve opening sensor 16, etc. In addition, this microcomputer 1 has the functions of operation of the self-diagnosis and the intake temperature, etc. as described later.

Further, connector 3 for inputting signals from the outside such as the engine speed and the accelerator pedal opening, and for outputting signals such as the air flow rate and the throttle valve opening, etc. to control unit (ECU) is provided in control module 2.

Because the detection, the correction, and the control of the intake air flow are performed by one unit in this invention, the closed correction and control in the unit becomes possible as described later. Further, the improvement of the installation to the engine, the reduction of the wire harness becomes, and the integration of electronic circuit becomes possible. It will not be necessary to provide with the power supply and the electric wave parts separately when electronic circuits are integrated.

Figure 3:
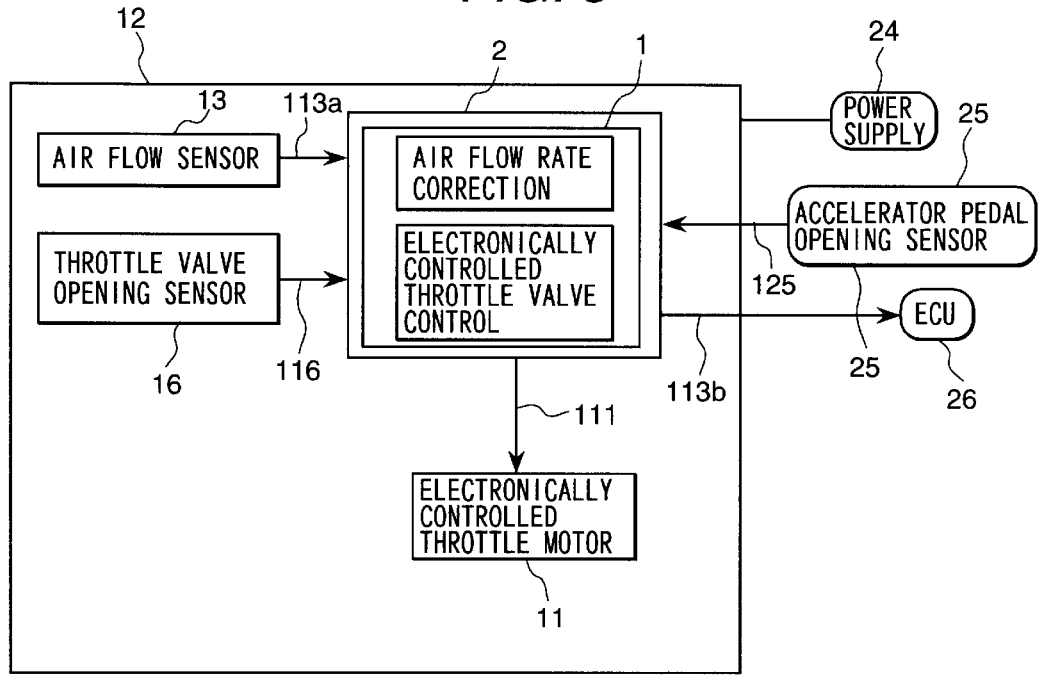
FIG. 3 is a block diagram to explain the operation of the air flow sensor of FIG. 1.

FIG. 3 shows the block diagram of FIG. 1. Microcomputer 1 in control module 2 corrects the air flow rate based on air flow rate signal 113 output from air flow sensor 13, and outputs the corrected air flow rate signal 113b to the external ECU26 in the electronically controlled throttle body integrated air flow sensor 12. Further, microcomputer 1 controls motor 11 which synchronizes with the throttle valve by motor control signal 111 according to throttle valve opening signal 116 obtained by throttle valve opening sensor 16 based on accelerator pedal opening signal 125 measured by accelerator pedal opening sensor 25 obtained from the outside. Further, these are driven by power supply 24.

Figure 4:
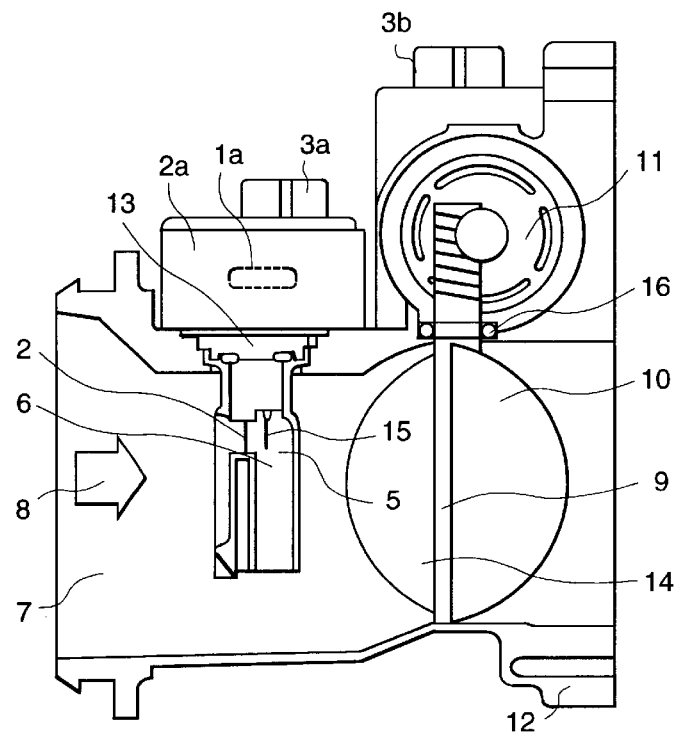
FIG. 4 is a cross-sectional view of the conventional electronically controlled throttle body integrated air flow sensor.
Figure 5:
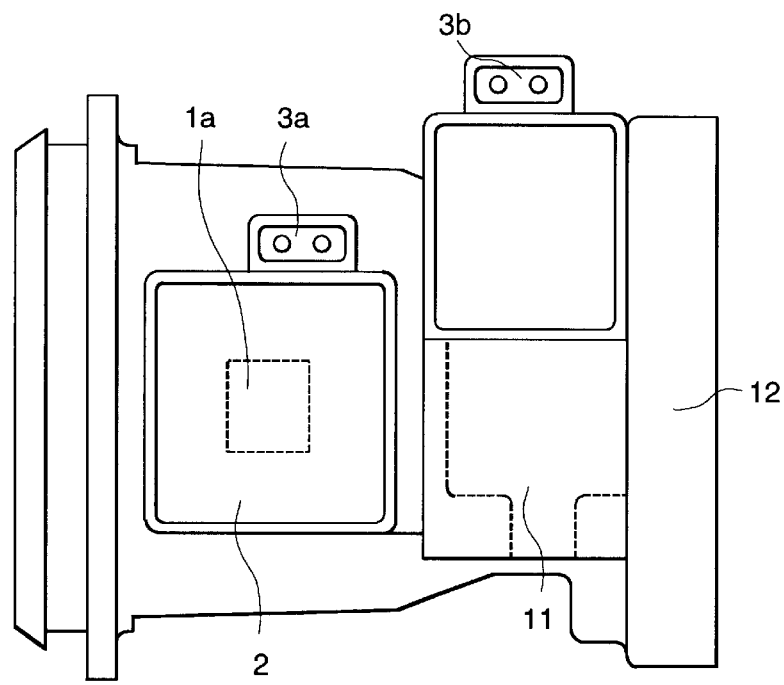
FIG. 5 is an outview in which the conventional air flow sensor of FIG. 4 is seen from the upper part of space.

FIG. 4 is a cross-sectional view of the conventional electronically controlled throttle body integrated air flow sensor. FIG. 5 is an outview in which the conventional air flow sensor of FIG. 4 is seen from the upper part of space.

Electronically controlled throttle body integrated air flow sensor 12 is provided with air flow sensor 13, circuit module 2a for controlling it, microcomputer 1a, connector 3a, electronically controlled throttle body 14, throttle shaft 9, throttle valve opening sensor 16, motor 11, and connector 3b.

Connector 3a outputs the air flow rate measured by electronically controlled throttle body integrated air flow sensor 12 to an external electronic control unit.

Connector 3b outputs throttle valve opening signal 116 obtained by throttle valve opening sensor 16 to an external control module which has an microcomputer, and receives a motor control signal from the control module.

Figure 6:
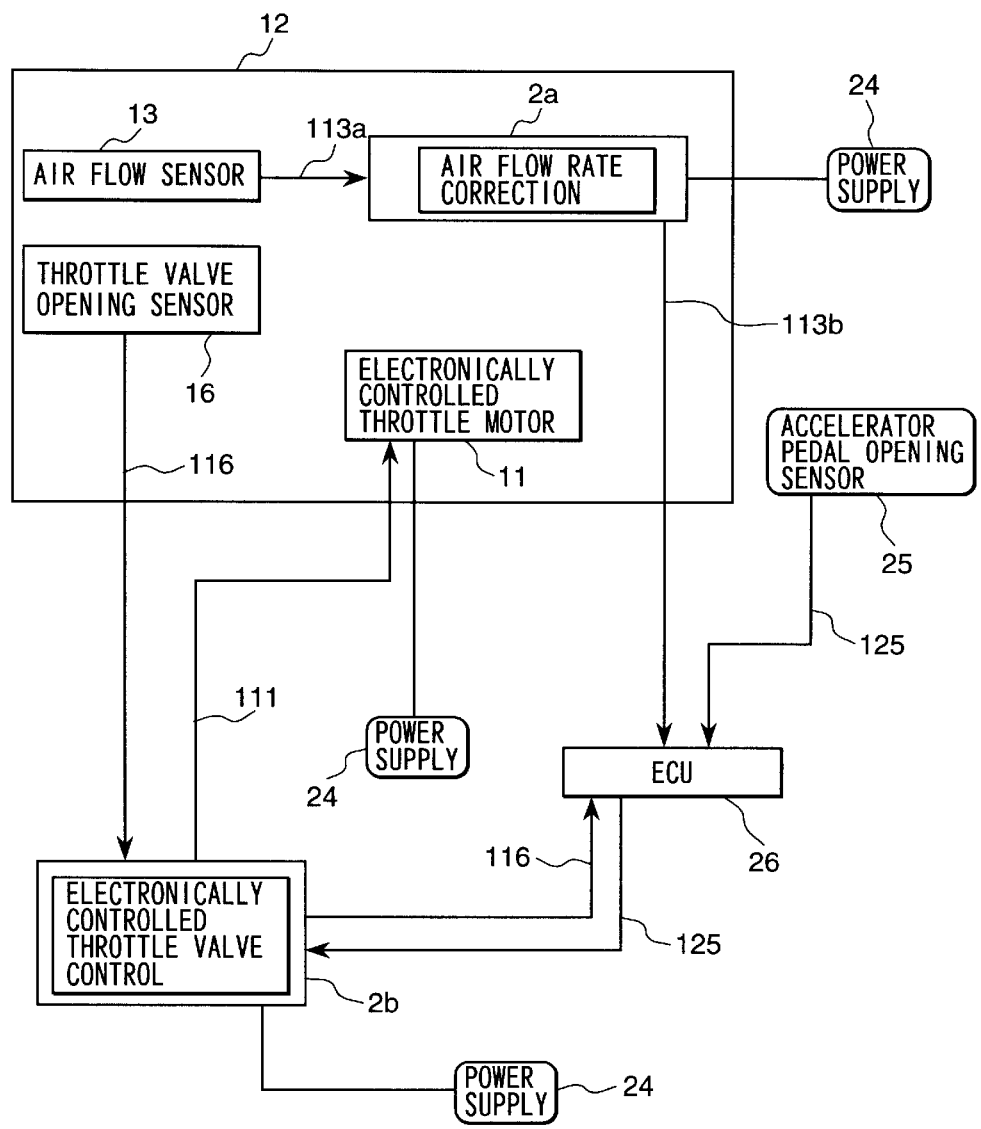
FIG. 6 is a block diagram to explain the operation of the conventional air flow sensor shown in FIG. 4.

FIG. 6 is a block diagram illustrating the operation of the conventional air flow sensor shown in FIG. 4.

Air flow rate 113a is measured by air flow sensor 13 in electronically controlled throttle integrated air flow sensor 12, and is corrected by microcomputer 1a in control module 2a. That is, it is possible to correct easily only by the air flow sensor unit. For instance, air flow rate signal 113b to which only the influence of the backflow is corrected is sent to external ECU 26. Further, throttle valve opening signal 116 detected by throttle valve opening sensor 16 in electronically controlled throttle integrated air flow sensor 12 is sent to external control module 2b and ECU 26.

ECU 26 corrects an accurate air flow rate by using throttle valve opening signal based on air flow rate signal 113b.

On the other hand, electronically controlled throttle motor 11 is controlled by motor control signal 111 in control module 2b and ECU26 based on accelerator opening signal 125 measured by the accelerator pedal opening sensor. Further, air flow sensor 13 and electronically controlled throttle body 14 are driven in separate power supplies 24.

Because, in the prior art, the amendment of the air flow rate and the motor control are carried out by the ECU, the ECU is under the overload, or the control module which has another microcomputer for the throttle control is needed. Further, there are a lot of wirings because all information is sent to the ECU.

Further, because the control circuits is separate, the power supply and the radio shielding parts are required for each circuit.

Figure 7:
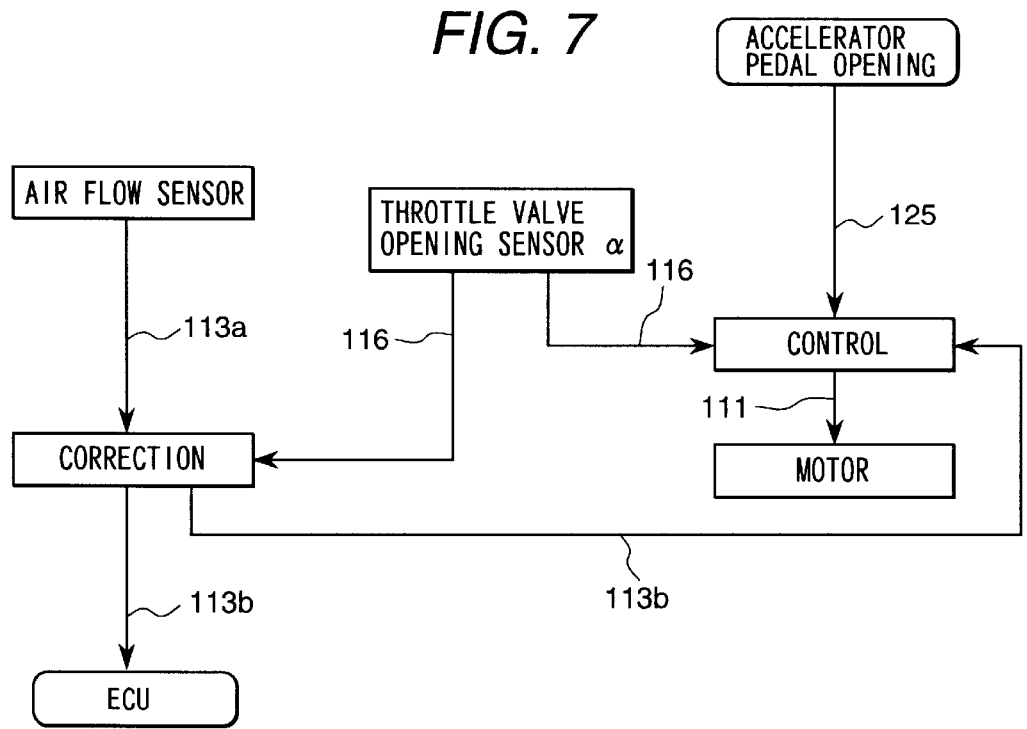
FIG. 7 is a flow chart of the operation of an electronically controlled throttle body integrated air flow sensor according to one embodiment of the present invention.

The embodiment of the correction means for the air flow rate measurement value and the throttle valve opening control means in the electronically controlled throttle body integrated air flow sensor according to the present invention is explained by using the flow chart of FIG. 7.

When the air flow sensor is integrated with the throttle body, different drifts are occurred in the main air passage of the air flow detection portion of the air flow sensor according to the throttle valve opening. Therefore, an error is easily occurred in the air flow detection value. It becomes possible to correct the air flow rate detection value based on the throttle valve if the measurement error of the air flow rate by throttle valve opening is known beforehand, because air flow rate signal 113 output from the air flow sensor and throttle valve opening signal 116 are input to microcomputer 1 in the present invention.

The electronically controlled throttle motor is driven, receiving motor control signal 111 determined in microcomputer 1 based on input accelerator opening signal 125, etc. The opening of the throttle valve is controlled by the motor drive. Further, the opening of the throttle valve is detected by the throttle valve opening sensor, and is feedback-controlled to always become appropriate for controlled variable of microcomputer 1. In the present invention, air flow rate signal 113a is corrected by using this throttle valve opening signal 116. This correction is made by using a map, etc. of the air flow rate detection error concerning the throttle valve opening, the air flow rate value, and their combination condition. The corrected air flow rate signal 113b is output to the ECU as an air flow rate signal detected by the electronically controlled throttle body integrated air flow sensor. Therefore, the air flow rate value to which the influence by throttle valve opening is greatly decreased by an internal correction is obtained, and a highly accurate engine control becomes possible in the electronically controlled throttle body integrated air flow sensor of the present invention.

On the other hand, it may be necessary to control the throttle valve opening based on the air flow rate signal to obtain the target air flow rate, in order to perform the control of the air flow rate when the engine is under an idling state, the decrease of the torque shock when the accelerator changes suddenly, and the control of the air flow rate matched to the amount of fuel supplied to the engine, although throttle valve opening is usually mainly controlled by the accelerator opening signal.

The control of throttle valve opening by the air flow rate becomes possible in the electronically controlled throttle body integrated air flow sensor, because motor control signal 111 which is the controlled variable of the electronically controlled throttle motor can be determined based on air flow rate signal 113b to which the above-mentioned correction is made as shown in FIG. 7.

Figure 8:
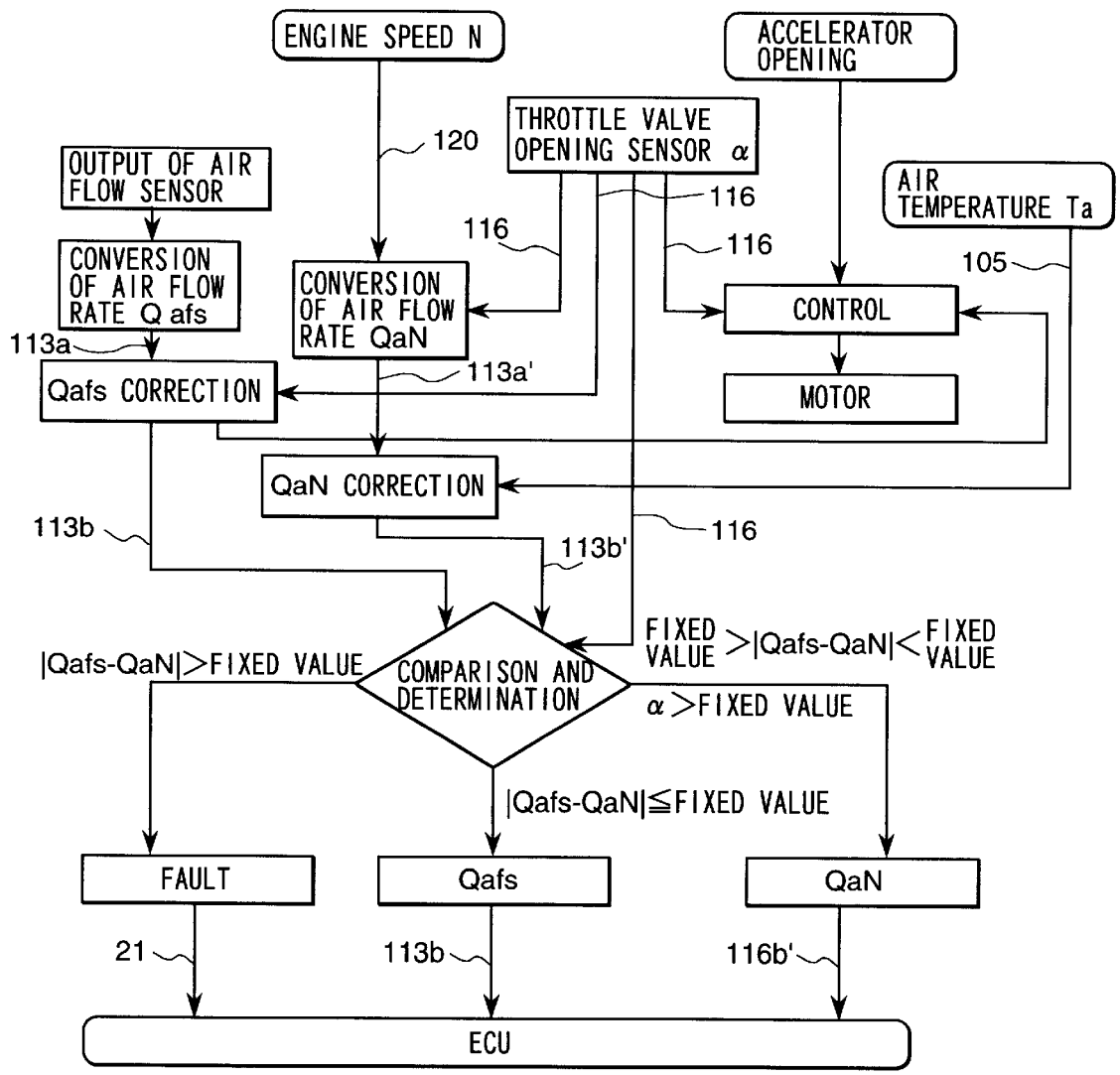
FIG. 8 is a flow chart of the operation of an electronically controlled throttle body integrated air flow sensor according to one embodiment of the present invention.
Figure 9:
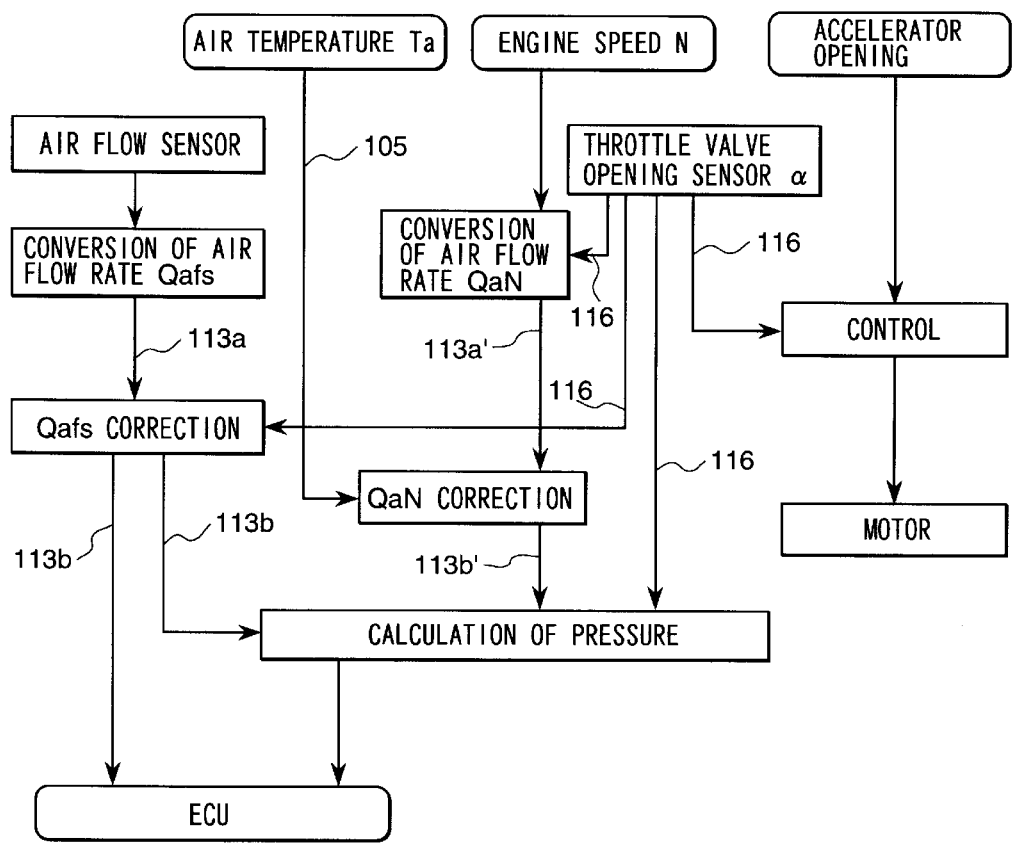
FIG. 9 is a flow chart of the electronically controlled throttle body integrated air flow sensor according to one embodiment of the present invention.

Next, one embodiment is explained by using FIG. 8, in which an appropriate air flow rate can be output or fault self-diagnosis can be performed by an electronically controlled throttle body integrated air flow sensor of the present invention when a certain kind of abnormality is caused.

The air flow rate signal output to the ECU is air flow rate signal 113a itself obtained by the air flow sensor, or corrected air flow rate signal 113b based on throttle valve opening as mentioned above. The ECU performs the engine control of fuel injection quantity, etc. based on this signal. Therefore, when the air flow sensor outputs an abnormal signal due to the breakdown etc., the proper engine control is failed. When the air flow rate signal is outside usual output ranges of 0V or 5V or more, etc., the air flow sensor is diagnosed as the fault, or the breakdown of the air flow sensor is diagnosed based on the comparison with the detection signal of the density of oxygen in exhaust gas.

It is possible to obtain air flow rate Q$\alpha$N 113a' by a so-called $\alpha$-N method besides the air flow rate measured by the air flow sensor by using throttle valve opening signal 116 which the device itself possesses and engine speed signal 120 obtained from the outside or the inside, by the microcomputer in an electronically controlled throttle body integrated air flow sensor according to the present invention. In addition, the corrected second air flow rate signal Q$\alpha$N 113b' which it compares and contrasts easily to the corrected mass flow rate Qafs 113b measured by the heat resistor type air flow sensor, by correcting the air flow rate based on the air temperature signal 105 obtained from the outside or the inside.

Therefore, the first air flow rate Qafs thought to be more highly accurate is output as an air flow rate signal when the difference between the first air flow rate Qafs obtained by the air flow sensor and the 2nd air flow rate Q$\alpha$N, obtained by the comparison operation is the fixed value or less.

Fault signal 21 which informs the breakdown of this device is sent to the outside, for example, ECU 26 when the difference more than a certain predetermined value is generated.

This fault signal 21 can be assumed to be a signal with an easy breakdown judgment by the electronic control unit by assuming the air flow rate signal to be 0V for instance even if another signal wire is not provided.

Further, the safety faction concerning the throttle control is backed up enough.

Therefore, when abnormality is not admitted in the throttle valve control by other diagnoses, it is also possible to judge that it is a breakdown of the air flow sensor, and to output the second air flow rate Q$\alpha$N as the air flow rate signal.

In addition, the heat resistance type air flow sensor etc. might cause the error in the measured air flow rate by the pulsation flow and the backflow, etc. caused in the main air passage in the air flow rate measurement portion when throttle valve opening is large. Therefore, it is possible to output the second air flow rate Q$\alpha$N as the air flow rate signal by switching to the second air flow rate without diagnosing the failure when the throttle valve opening is more than the predetermined value.

Here, a means for obtaining the pressure by using the second air flow rate Q$\alpha$N is explained with reference to FIG. 8. The second air flow rate Q$\alpha$N obtained by the same method as the above-mentioned embodiment is a volumetric flow rate. On the other hand, the first air flow rate Qafs obtained by the heat resistance type air flow sensor is a mass flow rate. Therefore, there is a difference of the measurement according to the temperature and pressure between the two. That is, the air pressure is obtained by dividing the mass flow rate by the volumetric flow rate, and air pressure is obtained by multiplying the ratio of the air density in standard condition which is already-known as the physical properties value, the ratio of the air temperature signal 115 which is the intake temperature obtained from the outside or the inside to the ratio of the standard temperature, and the standard pressures. As a result, the output to the ECU, etc. becomes possible.

Figure 10:
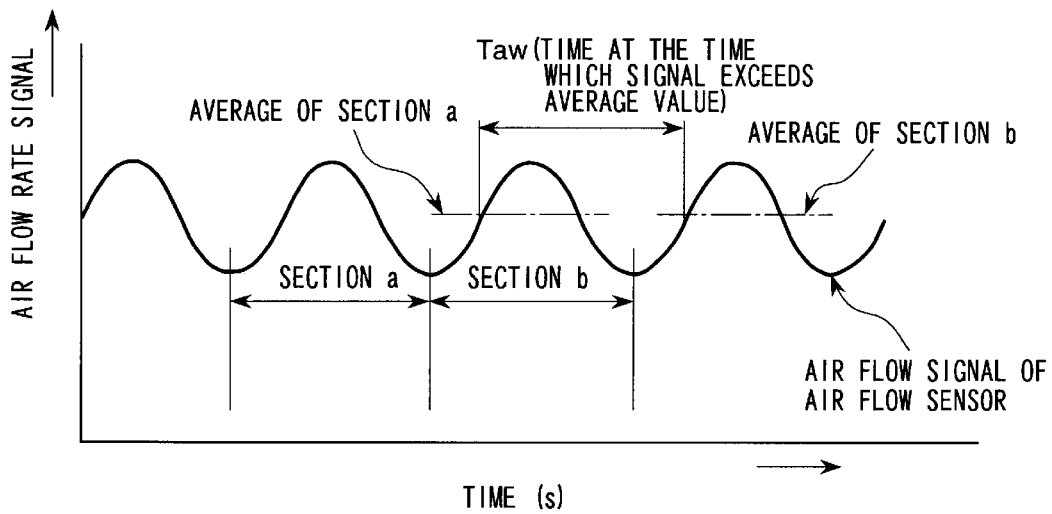
FIG. 10 is an explanatory drawing to calculate the engine speed.

FIG. 10 is an explanatory drawing of the method of calculating the engine speed from the air flow rate signal.

As a result, the calculation of the engine speed becomes possible by an electronically controlled throttle body integrated air flow sensor. The axis of ordinate designates an air flow rate signal of the air flow sensor in the suction stroke of the engine, and the axis of abscissa designates time.

When the engine is driven at a constant revolution speed, the air flow rate signal of the air flow sensor shows the constantly periodic pulsation like the sine wave. The reason for this is that the intake air amount increases gradually when the suction stroke is started, and it decreases gradually when the suction stroke advances to some degree.

In the present invention, the method of obtaining the engine speed from pulsation waveform generated in this suction stroke is adopted.

Namely, as shown in FIG. 10, the engine speed when the intake air is pulsated can be led by counting the time (Taw) from the time when the pulsation waveform of the air flow rate signal to lead the engine speed exceeds the mean value of the air flow rate signal in one-suction-stroke previous stroke (section a) to the time when it exceeds the mean value in the suction stoke (section b) of the following cylinder, and calculating backward according to the number of cylinders of engine by using this time.

In a word, the transition duration of the suction stroke between cylinders is measured.

The formula by which the engine speed is led from the transition duration of the suction stroke between cylinders is as follows.

$$NE = 60/Taw * Nci$$

NE: Engine speed (r/min)
Taw: Transition duration of the suction stroke between cylinders (s)
Nci: The number of cylinders.

Figure 11:
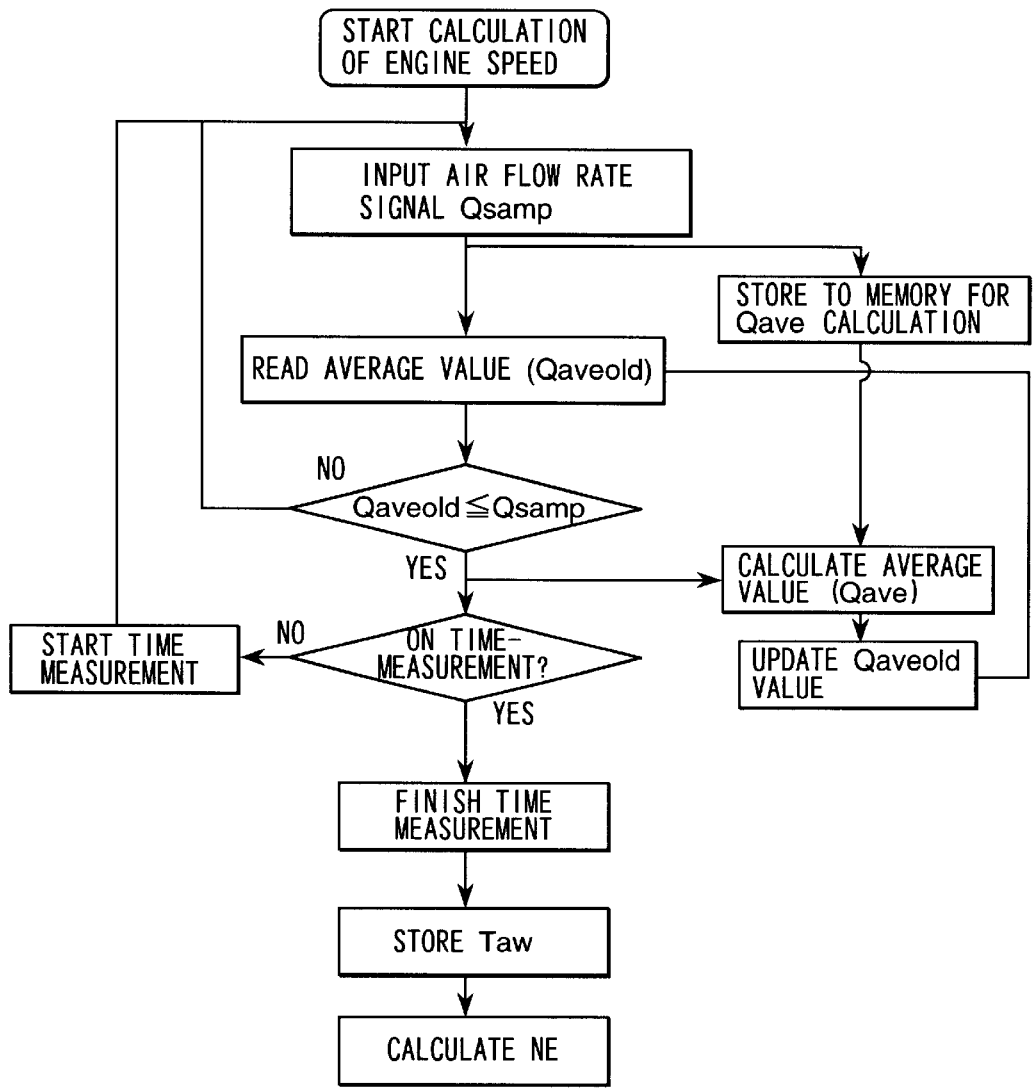
FIG. 11 is a flow chart to calculate the engine speed.

FIG. 11 is a flow chart illustrating the operation when the engine speed is obtained from the air flow rate signal.

Air flow rate signal Qsamp is converted to numeric value by an A/D converter, etc.

The converted air flow rate value Qsamp is stored in the memory to take average Qave in a constant section. At the same time, Mean value Qaveold of the intake air flow rate calculated previously from this suction stroke and the air flow rate value Qsamp taken at this time is compared.

As a result, if the air flow rate value Qsamp taken at this time is smaller than the previous mean value Qaveold, the count of time is not carried out.

In addition, the air flow rate signal is taken, and when the air flow rate value Qsamp taken at this time becomes larger than the average value Qaveold, the count of is started.

The intake air attenuates gradually and is succeeded to the following suction stroke as explained previously. The count is stopped and the time of the suction stroke is stored as data when the air flow rate value Qsamp taken in this attenuation process reaches a smaller value than the mean values Qaveold, and it becomes a value which exceeds the mean value again.

Here, the mean value Qave of air flow rate value Qsamp which has been measured before is calculated at the same time, the measurement is prepared for the next suction time, and the time counter is initialized.

Thus, the second air flow rate QαN described before is calculated by using the engine speed obtained like this.

The engine speed can be obtained even by another method.

The present invention has the function that the engine speed can be calculated by using the change in the intake air pressure in the main air passage of the electronically controlled throttle body integrated air flow sensor in which the pressure sensor described later is integrated.

It is possible to calculate this engine speed by detecting the state in which the pressure fluctuation of the intake air changes according to the pulsation of the intake air of the engine like the air flow rate signal.

Figure 12:
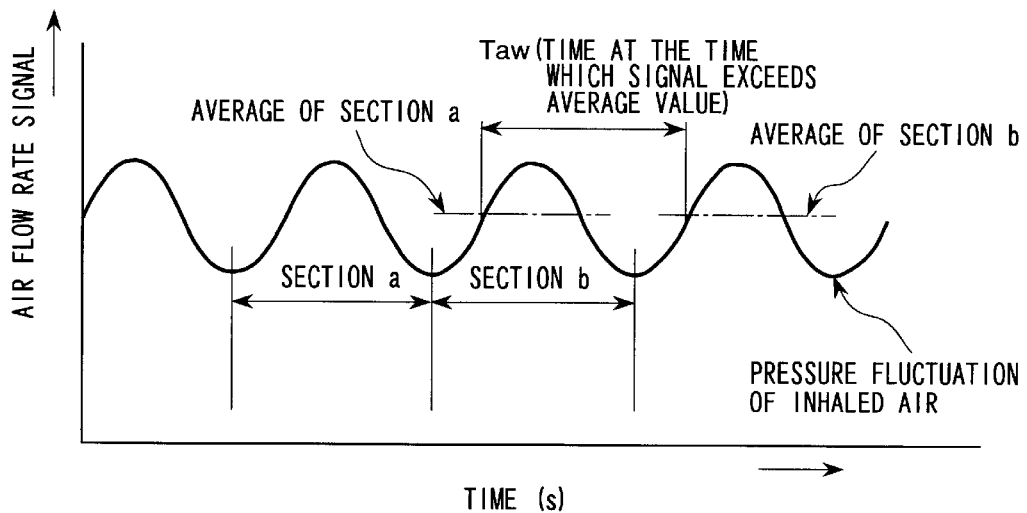
FIG. 12 is an explanatory drawing to calculate the engine speed.

The fluctuation of pressure pulsates similarly almost with the output signal of air flow sensor shown in FIG. 10, in which the ordinate designates the pressure fluctuation of the intake air and the abscissa designates time as shown in FIG. 12.

Therefore, the engine speed can be calculated by using the same procedure as when the engine speed was obtained from the air flow rate, and the second air flow rate QαN can be calculated in the electronically controlled throttle body integrated air flow sensor itself.

Next, the method by which the intake temperature necessary for the correction of the second air flow rate QαN previously described etc. is calculated by the electronically controlled throttle body integrated air flow sensor.

The principle of operation of the heat resistor type air flow sensor is to detect the power consumption when giving the arbitrary calorific value, that is, temperature difference to the intake temperature.

In a word, the intake temperature is always detected.

Figure 13:
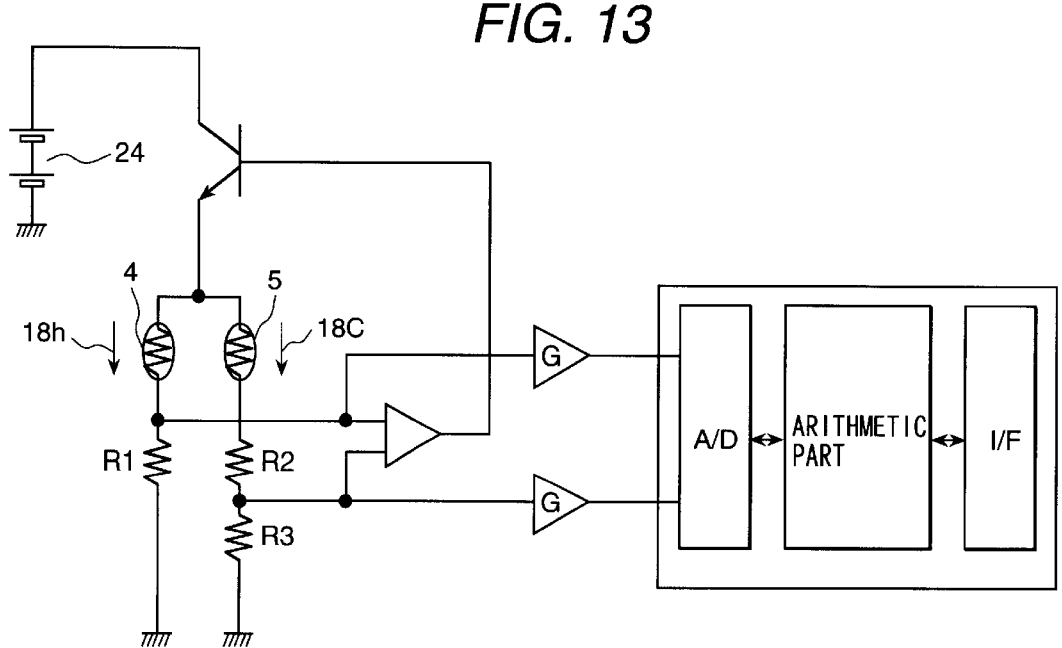
FIG. 13 is a circuit diagram of the air flow sensor which explains the function to calculate the temperature of air in the electronically controlled throttle body integrated air flow sensor.

The basic component of a typical driving circuit of the heat resistor type air flow sensor is shown in FIG. 13.

The resistance of thermosensitive resistor 5 is decided in accordance with the temperature of the intake air to which thermosensitive resistor 5 is exposed, when the arbitrary voltage is applied to thermosensitive resistor 5 for detecting the intake temperature shown in FIG. 13, and electric current 18 C corresponding to the temperature flows based on Ohm's law.

The heat voltage to apply to heat resistor 4 by a constant magnification is feedback-controlled based on the electric current 18C which flows according to the intake temperature.

Then, the control circuit detects current value 18h flowing through heat resistor 4. As a result, the air flow rate which flows to the surroundings of the air flow sensor can be obtained.

This is the principle of operation of the heat resistor type air flow sensor.

Then, the intake temperature can be easily obtained by detecting the electric current which flows to the thermosensitive resistor previously explained, and converting it into the intake temperature by the arithmetic circuit.

In one example of the present invention, the error of the air flow sensor occurred by intake temperature is corrected by using the intake temperature obtained by detecting the electric current which flows to the thermosensitive resistor as described above.

Figure 14:
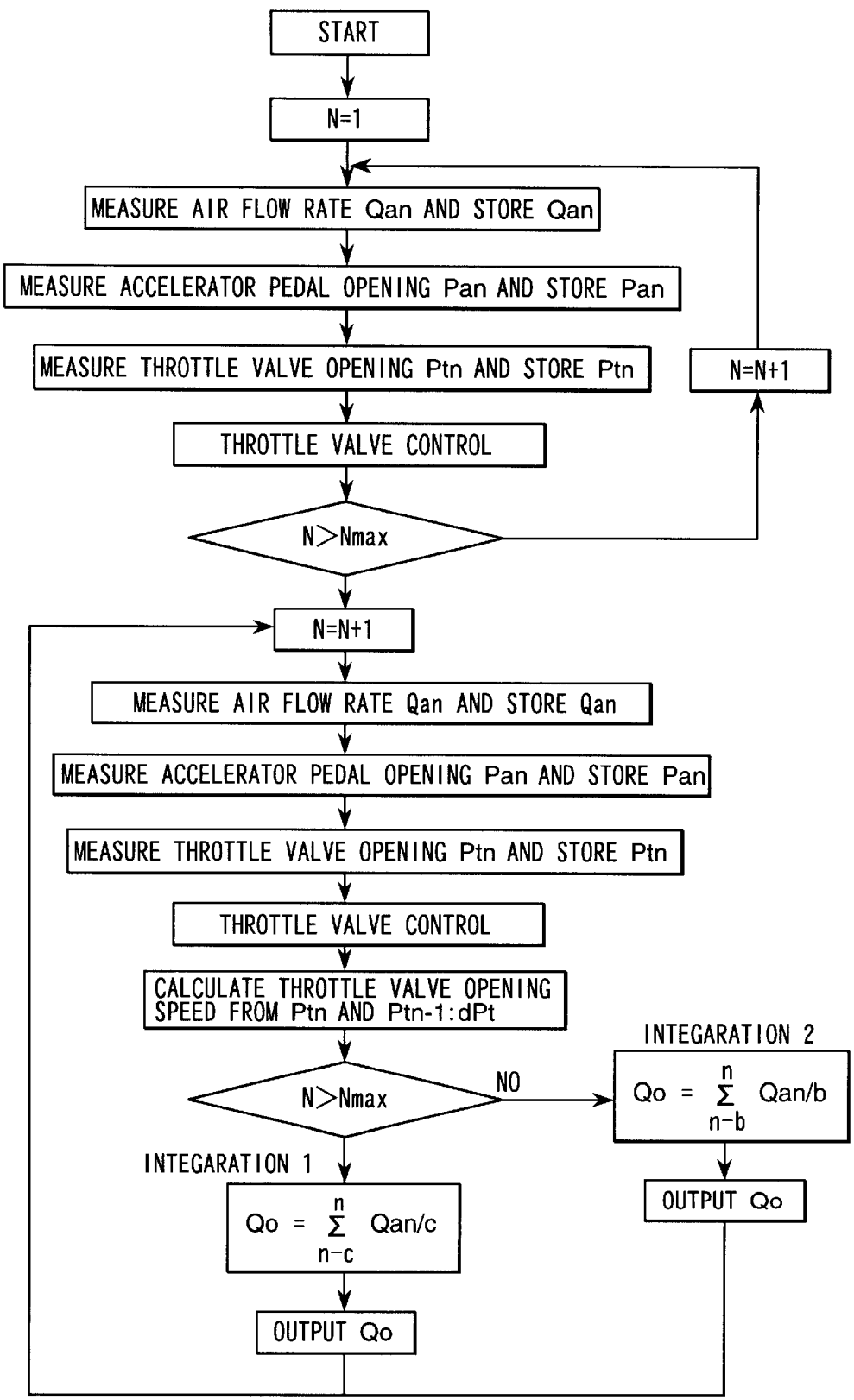
FIG. 14 is a flow chart of the operation of the electronically controlled throttle body integrated air flow sensor according to one embodiment of the present invention.

FIG. 14 is a flow chart illustrating the operation of one embodiment of the present invention. FIG. 15 is its timing chart. In FIG. 15, the ordinate designates the throttle valve opening, the air flow rate signal, and the air flow rate signal after the filter is put, and the abscissa designates time.

The electronically controlled throttle body calculates the best opening of the throttle means, for instance, throttle valve opening by the arithmetic circuit provided in said electronically controlled throttle body based on the accelerator pedal opening signal which is proportional to the opening of the accelerator pedal, and controls the throttle valve opening by the motor etc. Next, throttle valve opening provided on said electronically controlled throttle body is detected, whether the throttle valve opening is appropriate opening based on the signal of the throttle valve opening sensor is detected, and when not appropriate opening, the feedback control is performed to obtain appropriate opening.

Here, if there is no change or very small change in said accelerator opening signal in the unit time, by which the signal of said throttle valve opening sensor or the opening of the throttle valve is decided, the change in the actual air flow rate is not or is small. However, the noise due to the pulsation or the electric noise is superimposed to the air flow rate signal of the air flow sensor, and it outputs as if air flow rate is changed.

According to this embodiment, that the change dPs or dPt in the unit time is zero or is small is detected based on the signal Ps of said throttle valve opening sensor or the signal Pt of said accelerator pedal opening sensor which decides the opening of the throttle valve. And, these noises can be removed by selecting the integrator which integrates (filters) the air flow rate signal of the air flow rate measurement part by the arithmetic circuit according to dPlos or dPt, and outputting the integral value. Therefore, a more highly accurate and stable intake air flow signal can be output.

A method in which plural integrators of hardware type in which the electronic components and electrical components are combined are provided as said integrator each integration time constant, and the integrator with the time constant suitable for the throttle valve opening speed or the accelerator pedal opening speed is selected, or a method in which the integrator of software type which averages the air flow rate signal according to the throttle valve opening speed or the accelerator pedal opening speed is used or both of hardware type and software type are used in combination can be adopted.

In this embodiment, the software type is used.

Figure 16:
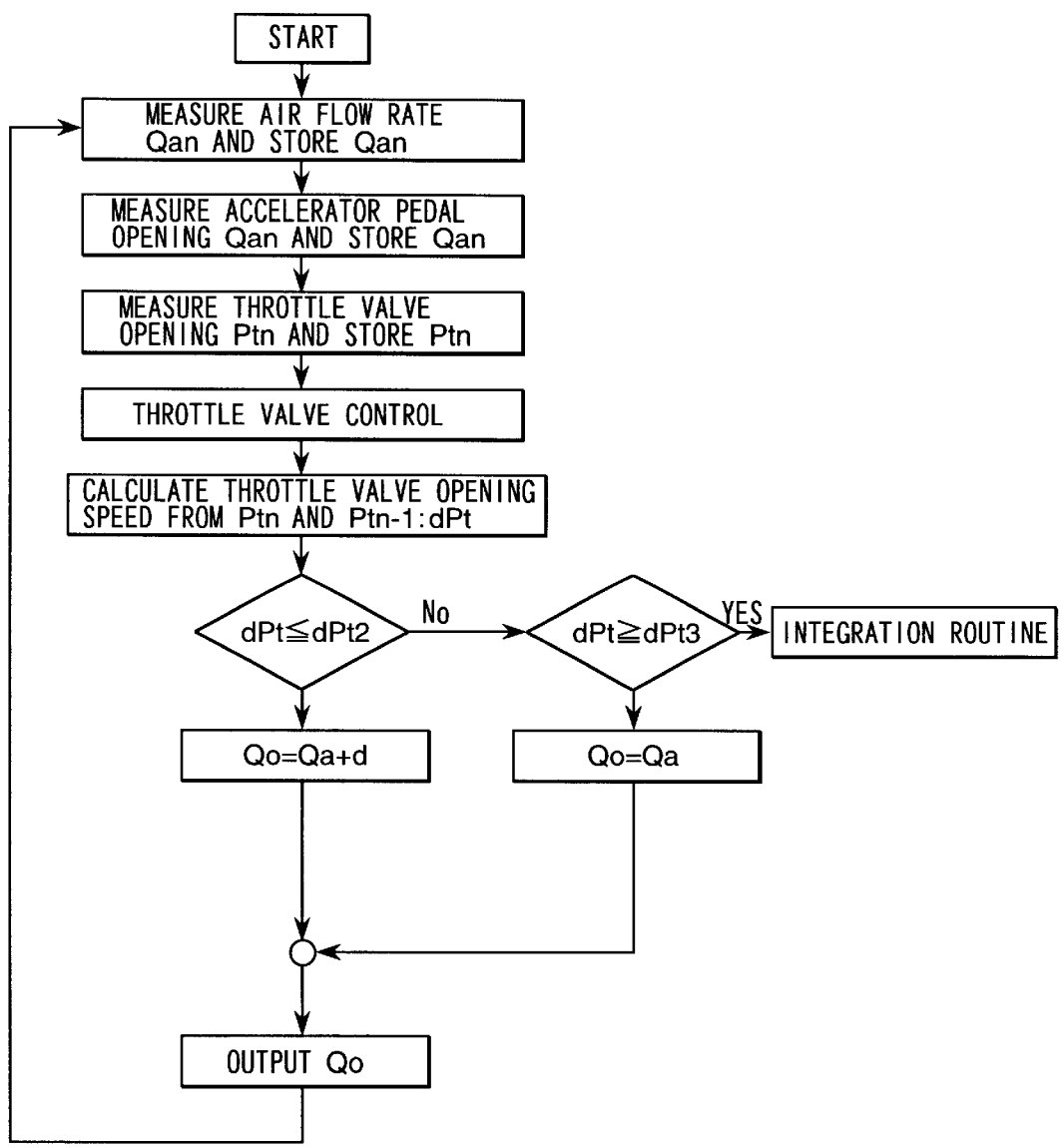
FIG. 16 is a flow chart of the operation of an electronically controlled throttle body integrated air flow sensor according to one embodiment of the present invention.

FIG. 16 shows the flow chart of the operation of the electronically controlled throttle body integrated air flow sensor according to one embodiment of the present invention. FIG. 17 shows its timing chart. The air flow rate signal is output through the integrator in the embodiment shown in FIG. 14. However, the response delay occurs for the change in the actual air flow if the integrator is added for the air flow rate signal when the throttle valve opening speed is fast.

According to this embodiment, the throttle valve opening speed is detected by comparing the change in the unit time for said throttle valve opening speed, and the signal of said throttle valve opening sensor or the signal of said accelerator pedal opening sensor which decides the opening of the throttle valve. When the detected throttle valve opening speed is faster than a fixed value, the air flow rate signal is directly output without passing through the integrator. When the throttle valve opening speed is far faster than the fixed value, the physical response delay of the heat resistor, for example, the delay for the actual air flow rate due to the delay of the thermal conduction or the heat transmission is occurred. As a result, the output of the air flow rate signal has the error corresponding to the amount of the delay. Therefore, if the throttle valve opening speed is far faster than the predetermined value, the fixed value is added by passing the differentiators or by passing the air flow rate signal through the adder circuit, and the corrected signal is output. As a result, a highly accurate stable intake air flow rate signal close to the actual air flow rate can be output.

A method in which plural differentiators of hardware type in which the electronic components and electrical components are combined are provided as said differentiator each differential constant, the differential constant suitable for the throttle valve opening speed or the accelerator pedal opening speed is calculated by the arithmetic circuit and the differentiator with suitable differential constant is selected, or a method in which the differentiator of software type which adds the value corresponding to the throttle valve opening speed or the accelerator pedal opening speed to the air flow rate signal is used or both of hardware type and software type are used in combination can be adopted.

A method in which plural adders of hardware type in which the electronic components and electrical components are combined are provided as said adder each adding constant, the adding constant suitable for the throttle valve opening speed or the accelerator pedal opening speed is calculated by the arithmetic circuit and the adder with suitable adding constant is selected, or a method in which the adder of software type which adds the value corresponding to the throttle valve opening speed or the accelerator pedal opening speed to the air flow rate signal is used or both of hardware type and software type are used in combination can be adopted.

Next, one embodiment of the electronically controlled throttle body integrated air flow sensor which can support a variety of engine layouts is explained with reference to FIG. 18 and FIG. 19.

Even if the air flow rate is the same, there is an error in the air flow rate value when the drift is caused in the element because the air flow rate is measured by small elements such as a heat resistor. The factor that the drift is caused is generated by the change in the form of the duct installed at the above-mentioned throttle valve position in the upstream of the air flow sensor or the position of said throttle valve. Therefore, the correction according to the duct form or the change in the output basis data of the air flow sensor is required.

The electronically controlled throttle body integrated air flow sensor of the present invention has two or more correction maps or basic data which correspond to the duct form change to support to a variety of engine layouts. Although the maps or basic data for the correction is for the duct form, it may prepare the map for the change in fuel cost and output.

The selection of the plural maps or basic data can be done freely or set only once or changed by using a specific condition, for instance, a special tool or password.

Figure 18:
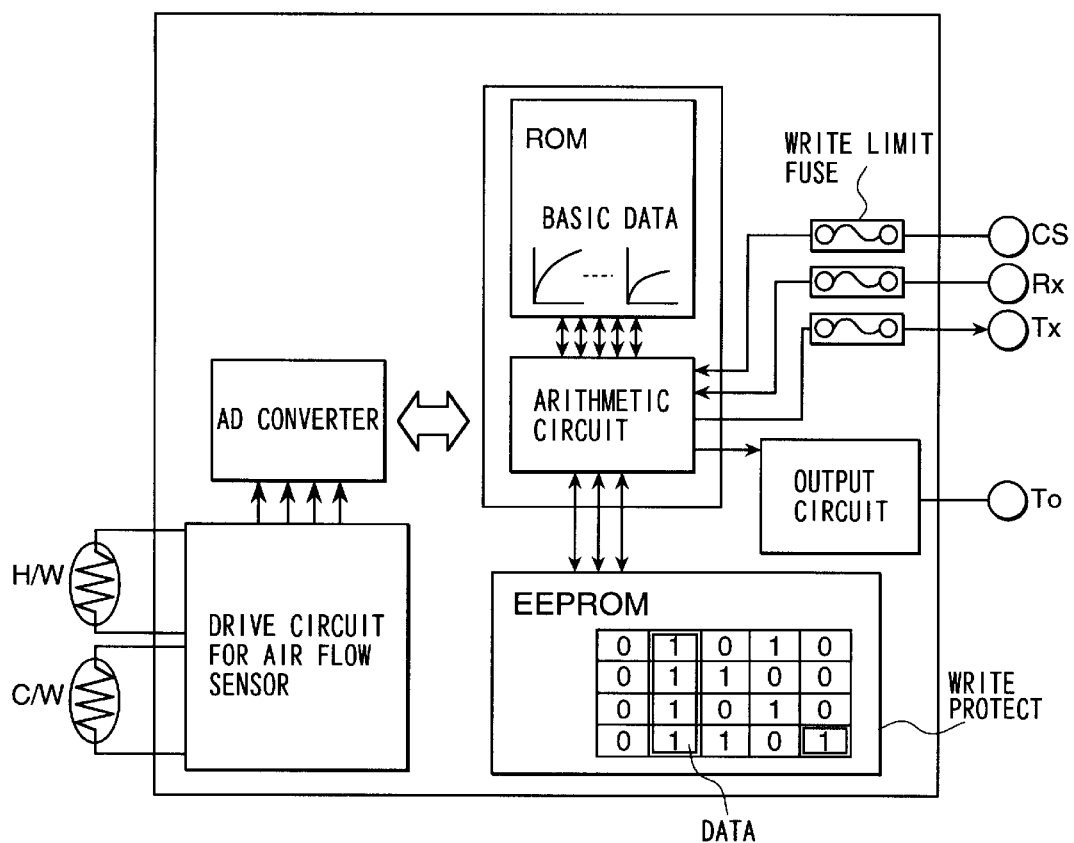
FIG. 18 is a system configuration chart according to one embodiment of the present invention.

The system configuration of said plural-basic data selection part of the electronically controlled throttle body integrated air flow sensor of the present invention is shown in FIG. 18.

Basic data is stored in a nonvolatile memory arranged in the control module, for example, ROM. At least one correction map is stored.

The basic data can be selected after the completion by using a memory which can read/write electrically, for example, a flash memory, an EEPROM, a fuse ROM, and zener zap, etc. different from the previous ROM as the control module.

The writing of data to the memory which can write electrically is performed by using the control module.

The control module limits so that the basic data described above may be not selected over a plurality of times in the present invention. The purpose of this is to avoid the data in use as a product being rewritten by some factors.

As a concrete method, 225 kinds of means as the write-protection method such as a method of mechanically intercepting the signal path of writing, and a method of protecting the writing by the content of the operation in the control module.

That is, there is a method of mechanically intercepting the writing route by fusing the writing limitation fuse shown in FIG. 18. In addition, there is a method of inhibiting the rewriting of the flash memory in the future by writing certain one data in the flash memory in the predetermined pattern for instance.

It is necessary to write the data by the control module in case of the writing means which requires the processing of software such as a flush memory and an EEPROM. However, it is not required to protect the writing in case of a means in which the data can be directly written into without the internuncial software like the fuse ROM, the zener zap, etc.

Further, rewriting basic data might be actually unavoidably needed in using the product.

The data can be rewritten by using a certain special means in the present invention for this.

Figure 19:
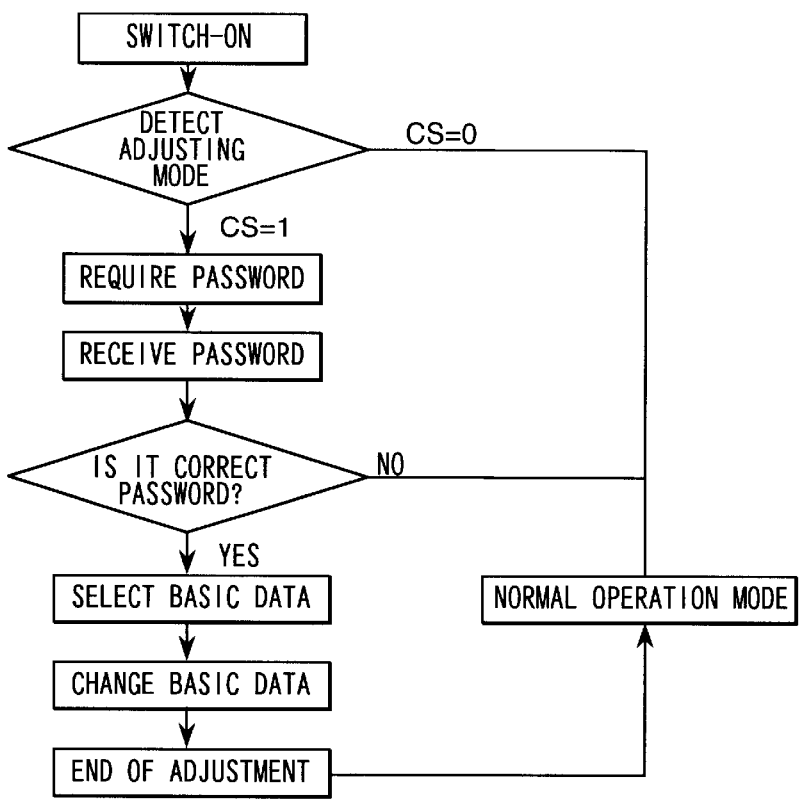
FIG. 19 is a flow chart of the operation of an electronically controlled throttle body integrated air flow sensor according to one embodiment of the present invention.

A flow chart of the way to demand the input of the password when writing again is shown in FIG. 19 as one embodiment to achieve such the configuration.

The control module demands the external adjustment circuit the input of the password as a condition necessary for writing when entering the writing mode. When the password is not input from the adjustment circuit, the control module shifts to a usual operational state and begins normal operation.

When the password is input from the adjustment circuit to the control module, it shifts to the state that basic data can be selected and writes the data in the memory which can write data electrically described above. Further, only a specific person can change by using the method of selecting correction value in software, for example, the use of the password and a method of selecting mechanically by using the screwdriver of which the point is formed in star-shape not used in general.

Figure 20:
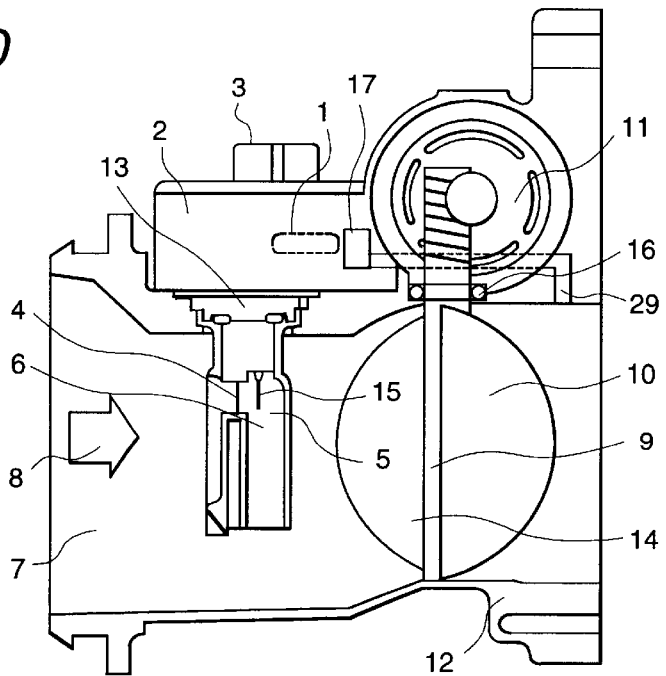
FIG. 20 is a cross-sectional view of an electronically controlled throttle body integrated air flow sensor according to one embodiment of the present invention.

FIG. 20 is a cross section showing the configuration of one embodiment of the throttle body integrated air flow sensor of the present invention different from FIG. 1. The difference with FIG. 1 is in the point that pressure measurement device 17 has been installed in control module 2 and that pressure inlet 29 for introducing the pressure of main air passage 7 in the downstream of the throttle valve to pressure measurement device 17. Other configurations and effects are the same as the electronically controlled throttle body integrated air flow sensor explained by using FIG. 1–FIG. 3.

The measurement of the atmospheric pressure becomes possible if pressure introducing inlet 29 is provided so as to open toward the outside of the throttle body although such the configuration is not shown in this embodiment. In addition, By opening this inlet toward both of the main air passage and the outside and by enabling the selection of the aperture by using a switch valve, the pressure in the main air passage in the downstream of the throttle body and the atmospheric pressure can be measured by one pressure measurement device.

In the electronically controlled throttle body integrated air flow sensor of the present invention, the control of the throttle valve control according to the correction of the pressure signal and the pressure signal becomes possible as well as the correction means of the air flow rate measurement value and the throttle valve opening control means explained with reference to FIG. 7. This will be explained with reference to FIG. 21.

When the pressure measurement device is integrated with the throttle body, it may be necessary to provide the opening end of the pressure introducing inlet in the neighborhood of the throttle valve. Therefore, the error is caused easily in the pressure detection value because the drift is caused in the main air passage in the installation part of the pressure introducing inlet similarly to causing the different drift according to throttle valve opening in the main air passage of the air flow rate sensing part in the air flow sensor. According to the present invention, if the pressure measurement error corresponding to the throttle valve opening is known beforehand because pressure signal 117a output from the pressure measurement device and throttle valve opening signal 116 are input to microcomputer 1, the correction of the pressure detection value becomes possible based on throttle valve opening. The opening of the throttle valve is controlled by the electronically controlled throttle motor driven by receiving motor control signal 111 decided by microcomputer 1 based on the input accelerator opening signal 125, etc. The opening of the throttle valve is detected by the throttle valve opening sensor, and feedback-controlled so as to always be appropriate to the controlled variable of microcomputer 1. In the present invention, the pressure signal 117a is corrected by using throttle valve opening signal 116 and a map showing the errors of the pressure detection under the conditions of the throttle valve opening, the pressure and the their combination. The corrected pressure signal 117a is output to the ECU as the pressure signal detected in the throttle valve opening. Therefore, according to the electronically controlled throttle body integrated air flow sensor of the present invention, the pressure value in which the influence by throttle valve opening is decreased by the internal correction can be obtained, and a highly accurate engine control becomes possible.

Figure 21:
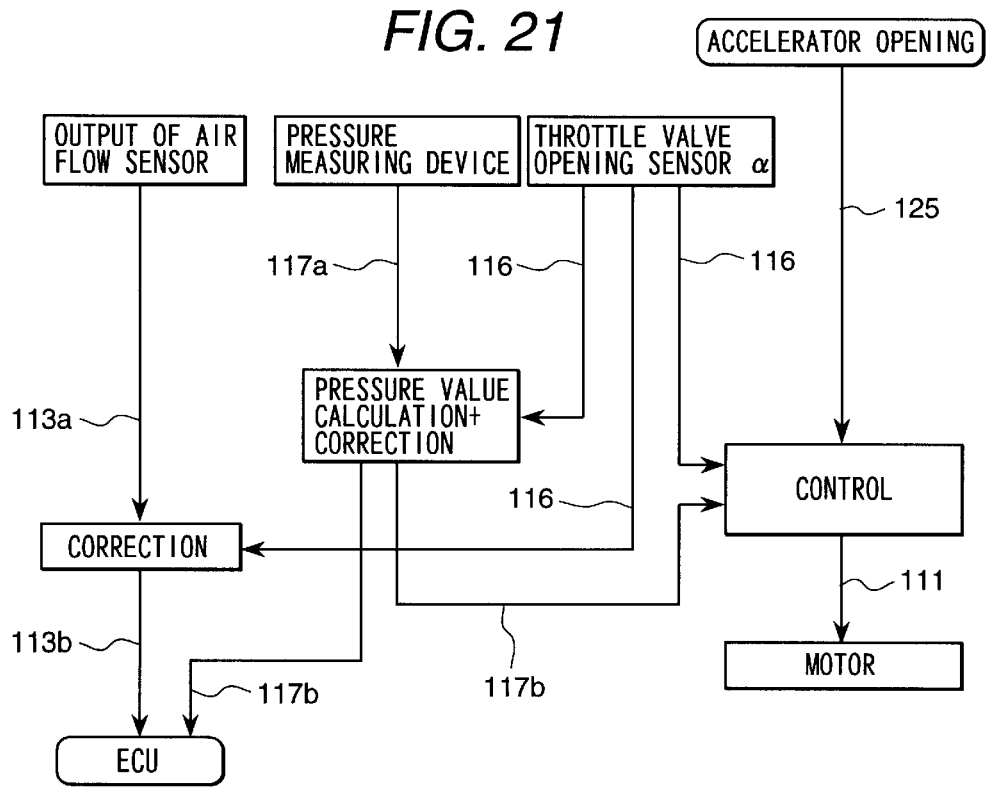
FIG. 21 is a flow chart of the operation of the electronically controlled throttle body integrated air flow sensor according to one embodiment of the present invention.

Further, the control of the throttle valve opening by the pressure becomes possible in the electronically controlled throttle body integrated air flow sensor because the controlled variable of the electronically controlled throttle motor can be determined based on the corrected pressure signal, as shown in FIG. 21.

One embodiment of the present invention in which the correction of the air flow rate measurement value, the fault diagnosis or the judgment of the best air flow rate is performed by the electronically controlled throttle body integrated air flow sensor will be explained next.

Figure 22:
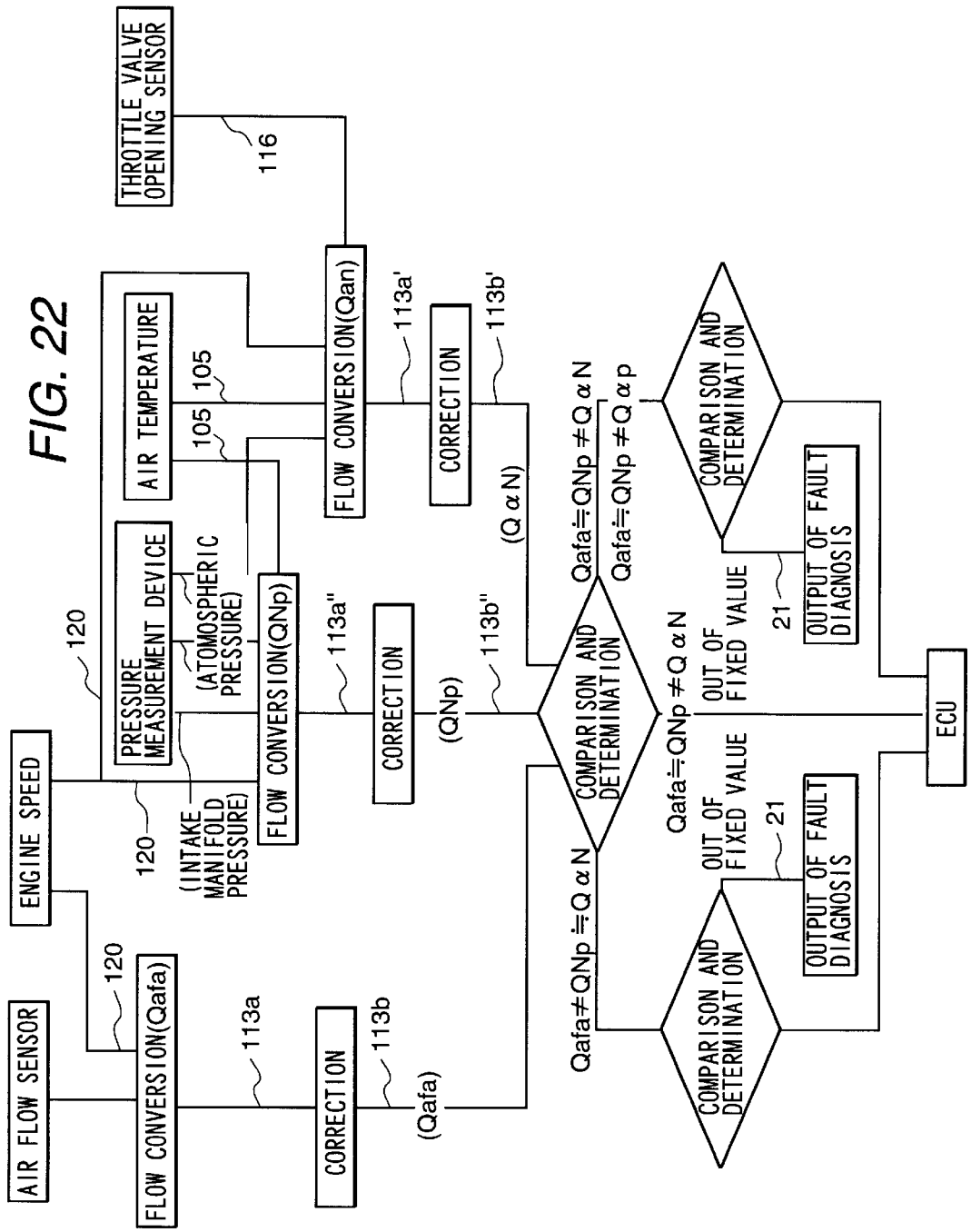
FIG. 22 is a flow chart showing the computational procedure.

FIG. 22 is a flow chart illustrating the main calculation procedure.

The air flow rate values obtained by the following three different method are compared after correction and judged. Namely, the air flow rate value 113a (Qafs) per the specific revolution speed obtained from the engine speed signal 120 and the output signal of the air flow sensor; the air flow rate value 113a" (QNρ) per the same specific revolution speed obtained from the intake manifold pressure output by the pressure sensor, the atmospheric pressure, the air temperature signal 105, and the engine speed signal 120; and the air flow rate value 113a' (QαN) per the same specific revolution speed obtained from throttle valve opening signal 116 of the throttle valve opening sensor, the atmospheric pressure signal, the air temperature signal 105, and the engine speed signal 120.

In this comparison and judgment, the correction value is not calculated when three kinds of air flow rate values are almost equal for instance (It is in the unnecessary-correction range), Qafs is output to the ECU as an air flow rate signal. The correction value of the Qafs is calculated when the Qafs is different from the other two kinds (QNρ and QαN). If it is a range of non-breakdown judgment, Qafs is output to the ECU. If it is a range of the breakdown judgment, fault signal 21 is output and the air flow rate value other than Qafs is output to the ECU. When QNρ or QαN is different from the other two kinds, the correction value is calculated, fault signal 21 is output, and Qafs is output to the ECU.

Therefore, because the correction value obtained as described above is fed back to the correction calculation part, each air flow rate value is converted into a highly accurate value with few errors such as deteriorating with the passage of time corrected by new correction. In addition, the appropriate fault diagnosis as described above becomes possible. Although each air flow rate values have been compared as a value of air flow rate for each specific revolution speed in this embodiment, it is possible to compare by using the mean value and the integrated value within the fixed time, or a value close to the mean value obtained by delaying through a filter, where the controlled variable per the revolution speed is output by inputting the engine speed.

In the flow chart of FIG. 22, although it is assumed the processing always go through the correction, the comparison and the judgment, it is possible to perform their processing every fixed period of time or only under the specific engine condition without always doing the processing of the comparison, the judgment, and the correction, etc., where the control variable is obtained by using, for example, Qafs.

Figure 23:
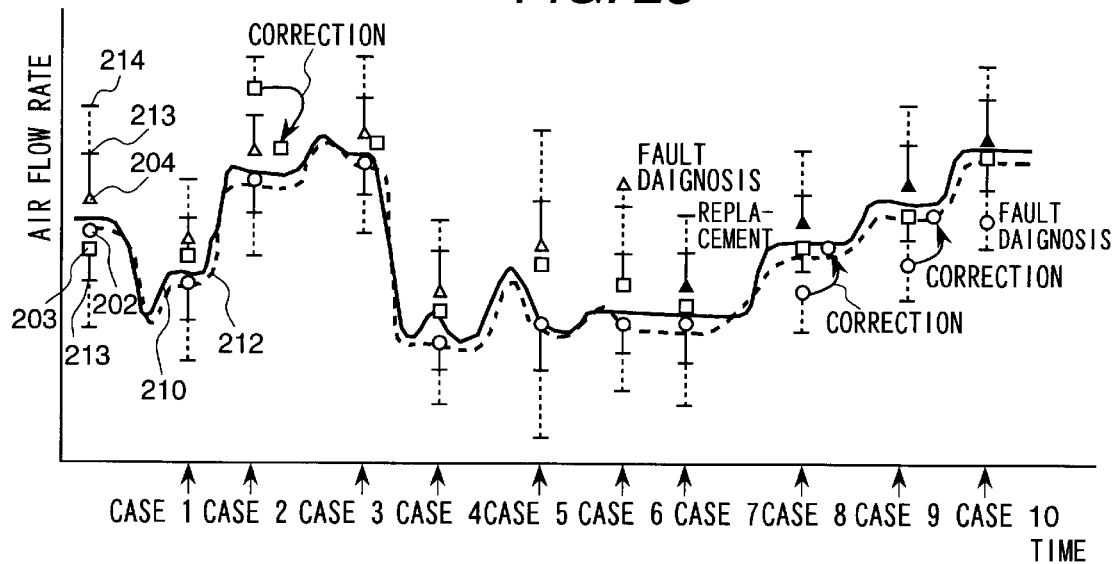
FIG. 23 is a model chart showing the operational state of the electronically controlled throttle body integrated air flow sensor according to one embodiment of the present invention.

FIG. 23 is a model chart showing the operational state of the electronically controlled throttle body integrated air flow sensor according to one embodiment of the present invention.

The axis of abscissa designates the running hours of the internal combustion engine which has the system of the present invention, and the ordinate designates the value of Qafs, QNρ, and QαN as the air flow rate. ○ sign 202 in figure shows the air flow rate Qafs obtained by the air flow sensor at each time (case), and □ sign 203 shows the air flow rate value QNρ by the speed-density method, and Δ sign shows the air flow rate value QαN by the α–N method. the correction-unnecessary range 213, that is, the range where each air flow rate value is almost equal, and the non-breakdown judgment range 214, that is, the range to recognize as the breakdown of the sensor which relates to the air flow rate detection when a different air flow rate value more than this range is indicate are shown in each case. Further, the transition model of the actual air flow rate is shown by solid line 210 as the reference although it is not possible substantially to detect by the system. The transition of Qafs at the time points when the comparison and judgment are not performed is shown in dotted line 212. In this model, the control is always performed by the Qafs, and the comparison, the judgment, and the correction are made under the specific condition or every certain period.

In case 1, because the all values of Qafs, QNρ, and QαN are in correction-unnecessary ranges 213, Qafs is used as the representative value for the controlled variable operation. Neither the correction nor the breakdown judgment are performed. In case 2, the correction value of QNρ is calculated because QNρ indicates the value different from Qafs or QαN and it becomes outside the correction-unnecessary range. Here, the correction of QNρ shows the example of the correction like becoming the same value as QαN which is a value close to QNρ among other air flow rate values. However, it is possible to take the mean value of two or the same value as Qafs. Case 3 shows the state that Qafs, QNρ, and QαN almost become equal again because the correction is added to QNρ. If the comparison, the judgment, and the correction is made under the specific condition, it is possible to make the comparison, the judgment, and the correction under the stable condition of the actual air flow rate like the above-mentioned case. However, the comparison, the judgment, and the correction can be done when the actual air flow rate has changed like case 4, in case that they are always done or they are done after a certain period.

It is also possible to expand the correction-unnecessary range or the non-breakdown judgment range in as transitional state as case 5 and to judge because the difference between respective air flow rate detection values can grow in such a transitional state. In case 6, QαN is greatly different from Qafs and QNρ, and it exceeds the non-breakdown judgment range. In this case, the fault signal of the throttle valve opening sensor is output. Case 7 shows the state that each air flow rate falls again in the correction-unnecessary range because the throttle valve opening sensor is exchanged. In case 8, Qafs becomes outside the correction-unnecessary range, and the correction is made.

As for subsequent case 9 and case 10, the fault signal of the air flow sensor is output because the Qafs exceeds the correction-unnecessary range again. When the same air flow rate value exceeds frequently the correction-unnecessary range, the sensor which affects the air flow rate value can be diagnosed to break down even if the air flow rate value is within the non-breakdown judgment range. Further, when Qafs exceeds the correction-unnecessary range, the QNρ is used to calculate the controlled variable in this model. Of course, another air flow rate value can be used, and the mean value can be also used. Giving priority in order with a high measuring accuracy, and using it for the controlled variable calculation and the correction calculation standard are effective usually.

Figure 24:
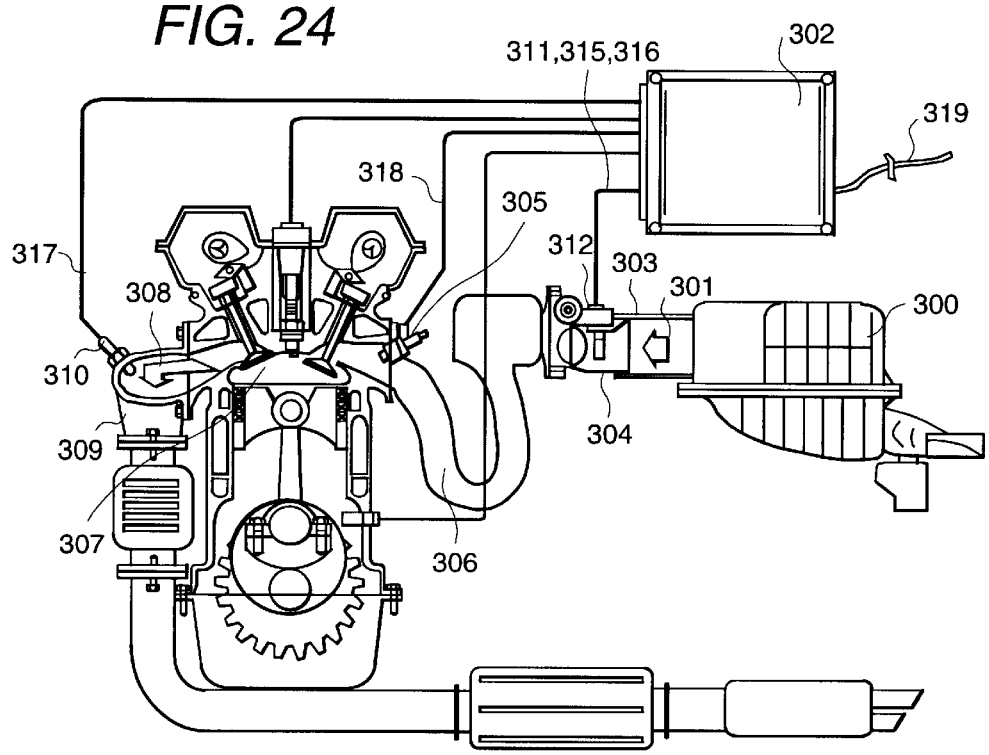
FIG. 24 is an illustration of the system of the internal combustion engine which uses an electronically controlled throttle body integrated air flow sensor according to one embodiment of the present invention.

FIG. 24 shows one embodiment in which the present invention is applied to the internal combustion engine of the electronic fuel injection type. Intake air 301 taken from air cleaner 300 is inhaled into engine cylinder 307 through air intake duct 303, electronically controlled throttle body integrated air flow sensor 304 provided with microcomputer 313, and manifold 306 provided with injector 305 for supplying the fuel. On the other hand, gas 308 generated by engine cylinder 307 is exhausted through exhaust manifold 309.

ECU 302 which inputs the corrected air flow rate signal 315 output from the electronically controlled throttle body integrated air flow sensor 304, throttle valve opening signal 316, engine speed signal 314, and oxygen density signal 317 output from oxygen analyzer 310 provided in exhaust manifold 309 calculates the best injection quantity according to air flow rate signals 315, makes the signal value to be injector control signal 318, and controls said injector 305. On the other hand, electronically controlled throttle body integrated air flow sensor 304 controls the electronically controlled throttle valve according to accelerator opening signal 319 by using microcomputer 313 in circuit module 312, and controls the air flow rate introduced into the internal combustion engine.

What is claimed is:

1. An integrated air flow sensor comprising:
   a body forming air passage, an air flow rate detection means for detecting the air flow rate which flows in said air passage, and a throttle means controlled with an electric signal, for limiting said air flow rate by reducing the flow, said body, said air flow rate detection means and said throttle means being integrated;

further comprising a correction and control means for correcting an input signal from said air flow rate detection means and controlling said throttle means.

2. An integrated air flow sensor according to claim 1, wherein said correction and control means makes said correction based on said reduction amount.

3. An integrated air flow sensor according to claim 1, wherein said correction and control means controls said throttle means so that the value of the signal after said correction is made may approach the target value.

4. An integrated air flow sensor according to claim 1, wherein said correction and control means calculates a second air flow rate based on the engine speed and said reduction amount, and outputs a specific signal when the difference between the signal value after said correction and the second air flow rate is more than the fixed value.

5. An integrated air flow sensor according to claim 1, wherein said correction and control means calculates a second air flow rate based on the engine speed and said reduction amount, and outputs said second air flow rate signal when the difference between the signal value after said correction and the second air flow rate is more than the fixed value.

6. An integrated air flow sensor according to claim 1, wherein said correction and control means calculates a second air flow rate based on the engine speed and said reduction amount and outputs it, when said reduction amount is below the fixed value.

7. An integrated air flow sensor according to claim 1, wherein said correction and control means corrects said second air flow rate based on the input air temperature.

8. An integrated air flow sensor according to claim 5, wherein said engine speed is detected based on the change in the value of the air flow rate signal detected in said air flow rate detection means.

9. An integrated air flow sensor according to claim 1, further comprising a thermosensitive resistor exposed to said air flow, wherein said air temperature is calculated by using an electric current which flows in said thermosensitive resistor or a voltage applied to both ends of said thermosensitive resistor.

10. An integrated air flow sensor according to claim 1, wherein said air flow rate detection means detects the air flow rate based on the amount of heat radiation from the resistor which generates heat, said throttle means is an electronically controlled throttle, and said correction and control means is an electric circuit provided with the microcomputer.

11. An engine control system comprising:
the integrated air flow sensor according to claim 1, and an engine control means for inputting a signal from said integrated air flow sensor, and controlling the amount of fuel supplied to an engine based on said signal.

12. An integrated air flow sensor comprising:
a body forming air passage, an air flow rate detection means for detecting the air flow rate which flows in said air passage, and a throttle means controlled with an electric signal, for limiting said air flow rate by reducing the flow, said body, said air flow rate detection means and said throttle means being integrated;
further comprising a pressure calculation means for calculating the pressure from the air flow rate detected by said air flow rate detection means, the engine speed, the reduction amount by said throttle means and the air temperature.

13. An integrated air flow sensor according to claim 12, wherein said engine speed is detected based on the change in the value of the air flow rate signal detected in said air flow rate detection element.

14. An integrated air flow sensor according to claim 12, further comprising a thermosensitive resistor exposed to said air flow, wherein said air temperature is calculated by using an electric current which flows in said thermosensitive resistor or a voltage applied to both ends of said thermosensitive resistor.

15. An integrated air flow sensor according to claim 12, wherein said air flow rate detection element detects the air flow rate based on the amount of heat radiation from the resistor which generates heat, said throttle body is an electronically controlled throttle, and said correction and control arrangement is an electric circuit provided with the microcomputer.

16. An integrated air flow sensor comprising:
a body forming air passage, an air flow rate detection means for detecting the air flow rate which flows in said air passage, and a throttle means controlled with an electric signal, for limiting said air flow rate by reducing the flow, said body, said air flow rate detection means and said throttle means being integrated;
further comprising a air flow rate calculation means for calculating the corrected air flow rate from the air flow rate detected by said air flow rate detection means, the engine speed, the reduction amount by said throttle means and the air temperature.

17. An integrated air flow sensor according to claim 16, wherein said engine speed is detected based on the change in the value of the air flow rate signal detected in said air flow rate detection element.

18. An integrated air flow sensor according to claim 16, further comprising a thermosensitive resistor exposed to said air flow, wherein said air temperature is calculated by using an electric current which flows in said thermosensitive resistor or a voltage applied to both ends of said thermosensitive resistor.

19. An integrated air flow sensor according to claim 16, wherein said air flow rate detection element detects the air flow rate based on the amount of heat radiation from the resistor which generates heat, said throttle body is an electronically controlled throttle, and said correction and control arrangement is an electric circuit provided with the microcomputer.

20. An integrated air flow sensor comprising:
a body forming air passage, an air flow rate detection means for detecting the air flow rate which flows in said air passage, and a throttle means controlled with an electric signal, for limiting said air flow rate by reducing the flow, said body, said air flow rate detection means and said throttle means being integrated;
further comprising an air flow rate calculation means for calculating the filtered air flow rate when the change speed in the reduction amount by said throttle means is less than a certain fixed value.

21. An integrated air flow sensor comprising:
a body forming air passage, an air flow rate detection means for detecting the air flow rate which flows in said air passage, and a throttle means controlled with an electric signal, for limiting said air flow rate by reducing the flow, said body, said air flow rate detection means and said throttle means being integrated;
further comprising an air flow rate calculation means for calculating the corrected air flow rate when the change speed in the reduction amount by said throttle means is more than a certain fixed value.

22. An integrated air flow sensor comprising:
- a body forming air passage, an air flow rate detection means for detecting the air flow rate which flows in said air passage, and a throttle means controlled with an electric signal, for limiting said air flow rate by reducing the flow, said body, said air flow rate detection means and said throttle means being integrated;
- further comprising two or more correction maps, and an air flow rate calculation means for calculating the air flow rate by using the correction map selected from said plural maps by an external signal.

23. An integrated air flow sensor according to claim 22, wherein the selection of the correction map is carried out once for all.

24. An integrated air flow sensor according to claim 22, wherein the selection of the correction map is able to change only when a specific condition is satisfied.

25. An integrated air flow sensor comprising:
- a body forming air passage, an air flow rate detection means for detecting the air flow rate which flows in said air passage, and a throttle means controlled with an electric signal, for limiting said air flow rate by reducing the flow, said body, said air flow rate detection means and said throttle means being integrated;
- further comprising a circuit which can perform the detection of said air flow rate and the control of said throttle means together.

26. An integrated air flow sensor comprising:
- a body forming air passage, an air flow rate detection means for detecting the air flow rate which flows in said air passage, and a throttle means controlled with an electric signal, for limiting said air flow rate by reducing the flow, said body, said air flow rate detection means and said throttle means being integrated;
- further comprising a correction and control means for performing the correction of signals from said air flow rate detection means and pressure detection means and the control of said throttle means.

27. An integrated air flow sensor according to claim 26, wherein said correction and control means corrects the signal from said pressure detection means based on said reduction amount.

28. An integrated air flow sensor according to claim 26, wherein said correction and control means controls said throttle means so that the signal of said pressure detection means may be made to approach the target value.

29. An integrated air flow sensor according to claim 26, wherein said correction and control means calculates a second air flow rate based on the engine speed and said reduction amount, calculates a third air flow rate based on the engine speed and the detection value of said pressure detection means, compares the first flow rate by said flow detection means, said second air flow rate and said third air flow rate, and outputs a specific signal when any one of values is different by more than the fixed value.

30. An integrated air flow sensor according to claim 26, wherein said correction and control means calculates a second air flow rate based on the engine speed and said reduction amount, calculates a third air flow rate based on the engine speed and the detection value of said pressure detection means, compares the first flow rate by said flow detection means, said second air flow rate and said third air flow rate, and outputs said second or third air flow rate signal when the difference between said first air flow rate and other air flow rate is more than the fixed value.

31. An integrated air flow sensor according to claim 26, wherein said correction and control means calculates a second air flow rate based on the engine speed and said reduction amount, calculates a third air flow rate based on the engine speed and the detection value of said pressure detection means, compares the first flow rate by said flow detection means, said second air flow rate and said third air flow rate, and performs the correction of displacement of the air flow rate, fault diagnosis, or the determination of the optimum air flow rate when the measurement values of any one of said first to third air flow rate measurement devices is different by more than the fixed value.

32. An integrated air flow sensor according to claim 26, wherein said correction and control means calculates a third air flow rate based on the engine speed and said pressure detection means and outputs it, when said reduction amount is below the fixed value.

33. An integrated air flow sensor according to claim 29, wherein said correction and control means corrects said second and said third air flow rate based on the input air temperature.

34. An integrated air flow sensor comprising:
- a body forming air passage, an air flow rate detection means for detecting the air flow rate which flows in said air passage, a throttle means controlled with an electric signal, for limiting said air flow rate by reducing the flow, and a pressure detection means for detecting the pressure at the downstream of said throttle means, said body, said air flow rate detection means, said throttle means and said pressure detection means being integrated;
- further comprising an air flow rate calculation means for calculating the corrected air flow rate pressure from the air flow rate detected by said air flow rate detection means, the pressure detection means for detecting the pressure at the downstream of said throttle means, the engine speed, the reduction amount by said throttle means and the air temperature.

35. An integrated air flow sensor according to claim 34, wherein said engine speed is detected based on the change in the value of the air flow rate signal detected in said air flow rate detection means.

36. An integrated air flow sensor according to claim 34, wherein said engine speed is detected based on the change in the value of the pressure signal detected in said pressure detection means.

37. An integrated air flow sensor according to claim 34, wherein said air temperature is calculated by using an electric current which flows in said thermosensitive resistor or a voltage applied to both ends of said thermosensitive resistor.

38. An integrated air flow sensor according to claim 34, wherein said air flow rate detection means detects the air flow rate based on the amount of heat radiation from the resistor which generates heat, said throttle means is an electronically controlled throttle, said pressure detection means is a semiconductor type pressure detection device and said correction and control means is an electric circuit provided with the microcomputer.

* * * * *